(12) United States Patent
Asano et al.

(10) Patent No.: US 8,119,739 B2
(45) Date of Patent: Feb. 21, 2012

(54) RETARDATION FILM

(75) Inventors: Hideo Asano, Osaka (JP); Akio Naka, Suita (JP); Hirokazu Niwa, Suita (JP); Tomoyuki Kuwamoto, Nara (JP); Hiroyasu Watabe, Suita (JP); Yoshiyuki Shiotani, Izumisano (JP)

(73) Assignee: Nippon Shokubai Co., Ltd., Osaka (JP)

( * ) Notice: Subject to any disclaimer, the term of this patent is extended or adjusted under 35 U.S.C. 154(b) by 743 days.

(21) Appl. No.: 12/280,789

(22) PCT Filed: Feb. 27, 2007

(86) PCT No.: PCT/JP2007/053570
§ 371 (c)(1),
(2), (4) Date: Oct. 10, 2008

(87) PCT Pub. No.: WO2007/099927
PCT Pub. Date: Sep. 7, 2007

(65) Prior Publication Data
US 2009/0135483 A1    May 28, 2009

(30) Foreign Application Priority Data

Feb. 28, 2006 (JP) .................... 2006-054135
Jun. 1, 2006 (JP) .................... 2006-153963

(51) Int. Cl.
C08F 269/00 (2006.01)
C08F 20/26 (2006.01)
G03C 1/00 (2006.01)
G03C 7/00 (2006.01)

(52) U.S. Cl. ............... 525/286; 430/285.1; 430/287.1; 526/318.42

(58) Field of Classification Search ............. 359/500; 525/286; 430/285.1, 287.1; 526/318.42
See application file for complete search history.

(56) References Cited

U.S. PATENT DOCUMENTS

| 4,789,709 A | 12/1988 | Kato et al. |
| 5,061,042 A | 10/1991 | Nakamura et al. |
| 5,660,044 A | 8/1997 | Bonciani et al. |
| 2002/0106568 A1* | 8/2002 | Asano et al. ............ 430/18 |
| 2007/0196592 A1 | 8/2007 | Ono |
| 2007/0243364 A1 | 10/2007 | Maekawa et al. |

FOREIGN PATENT DOCUMENTS

| JP | 4-84107 | 3/1992 |
| JP | 06-059121 | 3/1994 |
| JP | 2002-293956 A | 10/2002 |
| JP | 2004-54257 A | 2/2004 |
| JP | 2004-168882 | 6/2004 |
| JP | 2005-17435 A | 1/2005 |
| JP | 2005-43740 A | 2/2005 |
| JP | 2005-156864 | 6/2005 |
| JP | 2005-162835 | 6/2005 |
| JP | 2006-096960 | 4/2006 |
| WO | WO-2005/100457 A1 | 10/2005 |
| WO | 2005/105918 A1 | 11/2005 |

OTHER PUBLICATIONS

Awaya, H. (Oct. 15, 2001). "Measurement of Birefringence" Chapter 5 in *Introduction to Polarization Microscope for Polymer Material Analysis*. Agne Technology Center, pp. 76-84. (English translation of sections 5.1.1 and 5.1.2 attached, 7 pages).
International Search Report mailed May 22, 2007, for PCT Application No. PCT/JP2007/053570.
Korean Office Action mailed Apr. 27, 2010, for Korean Application No. 10-2010-7003880 filed Feb. 22, 2010, 4 pages (English translation attached, 6 pages).
Office Action received for Korean Patent Application No. 10-2008-7023480, mailed on Dec. 14, 2010, 10 pages (6 pages of English Translation & 4 pages of Office Action).
Office Action received for Japanese Patent Application No. 2007-050029, mailed on May 17, 2011, 7 pages (5 pages of English Translation and 2 pages of Office Action).

* cited by examiner

*Primary Examiner* — William Cheung
(74) *Attorney, Agent, or Firm* — Morrison & Foerster LLP

(57) ABSTRACT

The invention provides a retardation film, composed primarily of an acrylic polymer, with transparency, heat resistance, and large retardation. The retardation film of the present invention is composed primarily of an acrylic polymer. The film has an in-plane retardation of from 130 nm to 500 nm, inclusive, per 100 μm thickness at a wavelength of 589 nm. The film has a total light transmittance of not less than 85%. The retardation film has a glass transition temperature of preferably from 110° C. to 200° C., inclusive. The acrylic polymer, which is the primary component, preferably has a lactone ring structure.

22 Claims, No Drawings

RETARDATION FILM

CROSS REFERENCE TO RELATED APPLICATIONS

This application is a U.S. National Phase patent application of PCT/JP2007/053570, filed Feb. 27, 2007, which claims priority to Japan Application No. 2006-054135, filed Feb. 28, 2006 and Japan Application No. 2006-153963 filed on Jun. 1, 2006, both of which are hereby incorporated by reference in their present disclosure in their entirety.

TECHNICAL FIELD

The present invention relates to retardation films composed primarily of a highly transparent, heat-resistant acrylic polymer with an excellent phase retarding function.

BACKGROUND ART

We have seen in recent years growing screen size and application of the liquid crystal display device, and accompanying strong demand for improved visibility (bright, easy to see, high contrast, wide viewing angle, etc.). However, The demand for improved visibility is not sufficiently met by structural improvements of the liquid crystal cell alone. Whether or not the demand can be met depends largely on improvement in performance of retardation films and other optical films.

Hence, the retardation and other optical films are expected to offer high transparency, low photoelastic coefficient, heat resistance, light resistance, high surface hardness, high mechanical strength, large retardation, low wavelength dependency of retardation, and low incident angle dependency of retardation, among other properties.

A conventional method for imparting optical anisotropy to a transparent resin material is film stretching/orientation. It is known that after stretching/orientation, a film of polymethyl methacrylate (PMMA) or polystyrene (PS) exhibits negative birefringence, and a film of polycarbonate (PC) or cycloolefin resin (COP) exhibits positive birefringence. Positive birefringence means refractive index anisotropy in which the refractive index increases in the same direction as polymer molecular chains, part of the film structure, are stretched to orient molecules. Meanwhile, negative birefringence means refractive index anisotropy in which the refractive index decreases in the same direction, and increases perpendicular to that direction, as polymer molecular chains, part of the film structure, are stretched to orient molecules.

Current major resins for retardation films are polycarbonate (PC) (see Patent Documents 1 and 2) and cycloolefin resin (COP), for example, norbornene amorphous polyolefin (see Patent Document 3), all capable of creating large magnitude of retardation.

However, PC retardation films have a high photoelastic coefficient; retardation (retardation value) varies greatly even under small stress. The film cannot be placed under high tension, for example, when attached to other films. In addition, if the film, after being attached, is exposed to high temperature, the heat could induce stress which would in turn cause variation and non-uniformity in retardation. Another problem with the PC retardation film is poor weather resistance.

COP retardation films shows high heat resistance, but problematically poor adhesion.

In contrast, acrylic resin (acrylic polymer), of which PMMA is a typical example, is known to have excellent optical properties. The resin/polymer has been used in various applications as an optical material which provides high light transmittance, low birefringence, and low retardation. However, the acrylic resin inherently produces low retardation; a requisite retardation is hard to achieve by stretching. Furthermore, as liquid crystal displays are more often used in a harsh operating environment than before, there is a growing demand for optical films with high heat resistance. It is nevertheless difficult to give sufficient heat resistance to PMMA stretched film.

The acrylic resin, when made into a film, likely to develop cracks and other defects. A lot of improvements should be made before obtaining adequate mechanical strength, especially, flexibility.

There is on-going research activity to improve heat resistance by introducing various ring structures to the acrylic resin. Resins with improved heat resistance will likely be brittle, making resultant films less flexible.

Film stretching is known to improve flexibility of acrylic resin. By stretching a film, the molecular chains of the polymer making up the film are oriented, and the film comes to exhibit improved flexibility when folded at right angles to the stretching direction.

A retardation film of polymer makes use of the birefringence caused by molecular orientation by stretching. The film is usually manufactured by uniaxial stretching. Uniaxially stretching acrylic resin, however, makes the film less flexible than it should be when folded along an axis parallel to the stretching direction. Biaxial stretching gives sufficient flexibility along all axes, but causes molecules to lose its orientation in in-plane directions. That raises a problem that low birefringence acrylic resin, if biaxially stretched, cannot develop a sufficient in-plane retardation.

Patent Document 1: Japanese Unexamined Patent Publication No 63-189804/1988 (Tokukaisho 63-189804; published Aug. 5, 1988)

Patent Document 2: Japanese Unexamined Patent Publication No. 4-84107/1992 (Tokukaihei 4-84107; published Mar. 17, 1992)

Patent Document 3: Japanese Unexamined Patent Publication No. 6-59121/1994 (Tokukaihei 6-59121; published Mar. 4, 1994)

DISCLOSURE OF INVENTION

As described above, it is difficult to achieve requisite retardation by stretching an acrylic resin film although the film is excellent in optical transparency. It is well expected that the acrylic film, if given a capability to produce a high retardation, would likely make a retardation film with superior optical performance to the PC film and the COP film.

The present invention, conceived in view of these problems, has an objective of providing a retardation film, composed primarily of an acrylic polymer, with transparency, heat resistance, and large retardation.

A retardation film in accordance with the present invention is, to solve the problems, characterized in that: the film is a retardation film composed primarily of an acrylic polymer; the film has an in-plane retardation of from 130 nm to 500 nm, inclusive, per 100 μm thickness at a wavelength of 589 nm; and the film has a total light transmittance of not less than 85%.

Another retardation film in accordance with the present invention, to solve the problems, characterized in that: the film is a retardation film composed primarily of an acrylic polymer; the film has a thickness-direction retardation in absolute value of from 70 nm to 400 nm, inclusive, per 100

μm thickness at a wavelength of 589 nm; and the film has a total light transmittance of not less than 85%.

The retardation film in accordance with the present invention is preferably obtained by uniaxial stretching.

The retardation film in accordance with the present invention is preferably obtained by biaxial stretching.

The retardation film in accordance with the present invention is characterized in that the film has a glass transition temperature of from 110° C. to 200° C., inclusive.

The acrylic polymer preferably has a lactone ring structure.

The lactone ring structure preferably has general formula (1):

[Chem. 1]

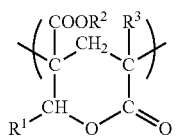
(1)

where each of $R^1$, $R^2$, and $R^3$ is independently either a hydrogen atom or an organic residue containing 1 to 20 carbons, and the organic residue may or may not contain an oxygen atom.

The retardation film in accordance with the present invention preferably when folded 180° in a direction parallel to a slow axis in a film plane and in a direction perpendicular to the slow axis in the film plane with a folding radius of 1 mm in a 25° C., 65% RH atmosphere, the film allows no cracks to develop in either of the directions.

The retardation film in accordance with the present invention preferably contains 5 wt % to 50 wt %, inclusive, elastic organic fine particles (crosslinked organic fine particles).

The retardation film in accordance with the present invention preferably contains 0 wt % to less than 5 wt % elastic organic fine particles.

In the arrangement, the retardation film contains elastic organic fine particles in an amount of less than 5 wt %. The arrangement provides a retardation film with high transparency, low haze, and excellent optical properties, and produces a limited amount of byproducts (foreign substance resulting from aggregation of the organic fine particles). Besides, the resin composition constituting the film has reduced melt viscosity. That allows process temperature to be lowered in molding and filtering, which in turn makes it possible to complete the filtering and other steps quickly. As a result, the film and the resin composition constituting the film decomposes under heat or colors only to a limited extent.

BEST MODE FOR CARRYING OUT INVENTION

A retardation film in accordance with the present invention is characterized in that: the film is composed primarily of an acrylic polymer; the film has an in-plane retardation of from 130 nm to 500 nm, inclusive, per 100 μm at a wavelength of 589 nm, and the film has a total light transmittance of not less than 85%.

Another retardation film in accordance with the present invention is characterized in that: the film is composed primarily of an acrylic polymer; the film has a thickness-direction retardation in absolute value of from 70 nm to 400 nm, inclusive, per 100 μm thickness at a wavelength of 589 nm; and the film has a total light transmittance of not less than 85%.

The retardation film in accordance with the present invention has a glass transition temperature of preferably from 110° C. to 200° C., inclusive. The following will describe the present invention in detail. Throughout this specification, "substance A is composed primarily of substance B" and "substance B is a primary component of substance A" both indicate that substance B accounts for 50 wt % or more of substance A. Besides, "weight" is a synonym to "mass," "wt %" to "mass %," and the range "A to B" to the range "not less than A and not more than B."

[Acrylic Polymer]

The acrylic polymer which is a primary component of the retardation film in accordance with the present invention is not limited in any particular manner so long as the polymer is a resin prepared by polymerization of a monomer composition containing (meth)acrylic ester as a primary component. Two or more acrylic polymers may be used as primary components.

The (meth)acrylic ester may be, for example, a compound (monomer) having a structure of general formula (2):

[Chem. 2]

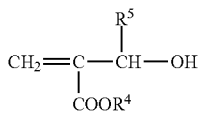
(2)

where each of $R^4$ and $R^5$ is independently either a hydrogen atom or an organic residue containing 1 to 20 carbons. Other examples include acrylic esters, such as methyl acrylate, ethyl acrylate, n-butyl acrylate, isobutyl acrylate, t-butyl acrylate, cyclohexyl acrylate, and benzyl acrylate; and methacrylic acid ester, such as methyl methacrylate, ethyl methacrylate, propyl methacrylate, n-butyl methacrylate, isobutyl methacrylate, t-butyl methacrylate, cyclohexyl methacrylate, and benzyl methacrylate. These compounds may be used alone or in any combination. Among them, the compounds having a structure of general formula (2) and methyl methacrylate are especially preferred for their excellent heat resistance and transparency. Benzyl (meth)acrylate is also preferred for its great positive birefringence (positive retardation).

If benzyl(meth)acrylate monomer structural units are introduced, the benzyl(meth)acrylate monomer structural units are present in the acrylic polymer in an amount of preferably from 5 to 50 wt %, more preferably 10 to 40 wt %, even more preferably 15 to 30 wt %.

Examples of compounds having a structure of general formula (2) include methyl 2-(hydroxymethyl)acrylate, ethyl 2-(hydroxymethyl)acrylate, isopropyl 2-(hydroxymethyl)acrylate, n-butyl 2-(hydroxymethyl)acrylate, and tertiary butyl 2-(hydroxymethyl)acrylate. Among these examples, methyl 2-(hydroxymethyl)acrylate and ethyl 2-(hydroxymethyl)acrylate are preferred because the examples greatly improve heat resistance. methyl 2-(hydroxymethyl)acrylate is especially preferred. The compounds of general formula (2) may be used alone or in any combination.

The acrylic polymer may have a different structure from the structure obtained by polymerization of the (meth)acrylic ester listed above. That structure is not limited in any particular manner. Preferred examples include polymer structural units (repeating structural units) obtained by polymerization of at least one of monomers of general formula (3), monomers containing hydroxyl groups, and unsaturated carboxylic acids:

[Chem. 3]

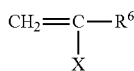

(3)

where: $R^6$ is either a hydrogen atom or a methyl group; X is one of a hydrogen atom, an alkyl group containing 1 to 20 carbons, an aryl group, an —OAc group, a —CN group, a —CO—$R^7$ group, and a —C—O—$R^8$ group; the Ac group is an acetyl group; each of $R^7$ and $R^8$ is either a hydrogen atom or an organic residue containing 1 to 20 carbons.

The monomer containing hydroxyl groups is not limited in any particular manner so long as the monomer does not have the structure of general formula (2). Examples include allyl alcohols, such as methallyl alcohol, allyl alcohol, and 2-hydroxymethyl-1-butene; α-hydroxymethyl styrene, α-hydroxyethyl styrene, 2-(hydroxyalkyl)acrylic ester, such as methyl 2-(hydroxyethyl)acrylate; and 2-(hydroxyalkyl) acrylic acid, such as 2-(hydroxyethyl)acrylic acid. These monomers may be used alone or in any combination.

Examples of the unsaturated carboxylic acid include acrylic acid, methacrylic acid, crotonic acid, α-substituted acrylic acid, and α-substituted methacrylic acid. These acids may be used alone or in any combination. Among them, acrylic acid and methacrylic acid are preferred to achieve the effects of the present invention to a sufficient extent.

Examples of the compounds of general formula (3) include styrene, vinyl toluene, α-methyl styrene, acrylonitrile, methylvinyl ketone, ethylene, propylene, and vinyl acetate. These compounds may be used alone or in any combination. Among them, styrene and α-methyl styrene are preferred to achieve the effects of the present invention to a sufficient extent.

The polymerization method is not limited in any particular manner. Any publicly known polymerization method may be employed. A suitable method may be employed according to the type, relative amount, etc. of the monomer (monomer composition) being used.

The acrylic polymer which is a primary component of the retardation film in accordance with the present invention has a glass transition temperature (Tg) of preferably from 110° C. to 200° C., more preferably from 115° C. to 200° C., even more preferably from 120° C. to 200° C., still more preferably from 125° C. to 190° C., most preferably from 130° C. to 180° C.

For improved heat resistance, an N-substituted maleimide, such as phenyl maleimide, cyclohexyl maleimide, and methyl maleimide may be copolymerized. Alternatively, a lactone ring structure, a glutaric anhydride structure, a glutarimide structure, or a like structure may be introduced to a molecular chain (alternatively termed a "main skeleton" or "main chain" of the polymer) for the same purpose. Especially, monomers containing no nitrogen atoms are preferred because they make a film which does not change color (turn yellow) easily. Monomers having a lactone ring structure in the main chain are also preferred because they readily provide positive birefringence (positive retardation). The lactone ring structure in the main chain may contain 4 to 8 members, but more preferably 5 to 6 members, even more preferably 6 members for structural stability. Examples of the 6-membered lactone ring structure in the main chain include the structure of general formula (1) and those described in Japanese Unexamined Patent Publication (Tokukai) No. 2004-168882. The structure of general formula (1) is preferred for the following reasons. The structure achieves a high polymerization yield in the synthesis of a polymer in which the lactone ring structure is yet to be introduced to the main chain. The structure readily produces a polymer containing a large proportion of lactone ring structure at a high polymerization yield. The structure is readily copolymerizable with methyl methacrylate and like (meth)acrylic esters.

If the acrylic polymer is a resin prepared by polymerization of a monomer containing a compound having a structure of general formula (2), the acrylic polymer more preferably has a lactone ring structure (hereinafter, the acrylic polymer having a lactone ring structure is referred to as the lactone ring-containing polymer). The following will describe the lactone ring-containing polymer.

An example of the lactone ring structure is the structure of general formula (1):

[Chem. 4]

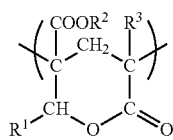

(1)

where each of $R^1$, $R^2$, and $R^3$ is independently either a hydrogen atom or an organic residue containing 1 to 20 carbons. The organic residue may or may not contain an oxygen atom.

The organic residues in general formulae (1), (2), and (3) are not limited in any particular manner so long as the residues contain 1 to 20 carbons. Examples include alkyl groups with a straight or branched chain, alkylene groups with a straight or branched chain, aryl groups, an —OAc group, and a —CN group.

The lactone ring structure is present in the acrylic polymer in an amount of preferably from 5 to 90 wt %, more preferably from 20 to 90 wt %, even more preferably from 30 to 90 wt %, still more preferably from 35 to 90 wt %, yet more preferably from 40 to 80 wt %, most preferably from 45 to 75 wt %. If the lactone ring structure is present in excess of 90 wt %, the polymer becomes difficult to mold, and the resultant film will likely exhibit reduced flexibility. Both phenomena are undesirable. If the lactone ring structure is below 5 wt %, the molded film hardly produces a requisite retardation and may have poor heat resistance, solvent resistance, and surface hardness. None of the phenomena is desirable.

Structures other than the lactone ring structure of general formula (1) are present as follows. Polymer structural units (repeating structural units) obtained by polymerization of the (meth)acrylic ester are present in the lactone ring-containing polymer in an amount of preferably from 10 to 95 wt %, more preferably from 10 to 80 wt %, even more preferably from 10 to 65 wt %, still more preferably from 20 to 60 wt %, most preferably from 25 to 55 wt %. Polymer structural units (repeating structural units) obtained by polymerization of the monomer containing hydroxyl groups are present in the lactone ring-containing polymer in an amount of preferably from 0 to 30 wt %, more preferably from 0 to 20 wt %, even more preferably from 0 to 15 wt %, still more preferably from 0 to 10 wt %. Polymer structural units (repeating structural units) obtained by polymerization of the unsaturated carboxylic acid are present in the lactone ring-containing polymer in an amount of preferably from 0 to 30 wt %, more preferably from 0 to 20 wt %, even more preferably from 0 to 15 wt %, still more preferably from 0 to 10 wt %. Polymer structural units (repeating structural units) obtained by polymerization of the monomer of general formula (3) are present in the lactone ring-containing polymer in an amount of preferably from 0 to 30 wt %, more preferably from 0 to 20 wt %, even more preferably from 0 to 15 wt %, still more preferably from 0 to 10 wt %.

The method of manufacturing the lactone ring-containing polymer is not limited in any particular manner. A preferred method may involve a polymerization step and a subsequent lactone cyclization condensation step. In the former step, a polymer is obtained containing hydroxyl groups and ester groups in molecular chains. The obtained polymer is heated in the latter step to introduce the lactone ring structure to the polymer, thereby yielding a lactone ring-containing polymer.

The monomer composition containing a compound of general formula (2) is polymerized to yield a polymer containing hydroxyl groups and ester groups in molecular chains.

The compound of general formula (2) is present in the monomer composition subjected to the polymerization reaction (polymerization step) in an amount of preferably from 22 to 80 wt %, more preferably from 24 to 50 wt %, even more preferably from 27 to 40 wt %. If the monomer of general formula (2) is present in the monomer component subjected to the polymerization step in an amount below 22 wt %, the molded film hardly produces a requisite retardation and may have poor heat resistance, solvent resistance, and surface hardness. None of the phenomena is desirable. If the monomer of general formula (2) is present in the monomer composition subjected to the polymerization step in an amount exceeding 80 wt %, gelation can occur in the polymerization reaction or the lactone cyclization. Also, the obtained polymer may possess insufficient flexibility and be difficult to mold. None of the phenomena is desirable.

The monomer composition subjected to the polymerization step may contain monomers other than those of general formula (2). Preferred examples of the monomers include the (meth)acrylic esters, monomers containing hydroxyl groups, unsaturated carboxylic acids, and monomers of general formula (3) listed earlier. The monomers other than those of general formula (2) may be used alone or in any combination.

If a (meth)acrylic ester other than the monomers of general formula (2) is used, that ester is present in the monomer component subjected to the polymerization step in an amount of preferably from 20 to 78 wt %, more preferably from 50 to 76 wt %, even more preferably from 60 to 73 wt %, to achieve the effects of the present invention to a sufficient extent.

If a monomer containing hydroxyl groups other than the monomers of general formula (2) is used, that monomer is present in the monomer component subjected to the polymerization step in an amount of preferably from 0 to 30 wt %, more preferably from 0 to 20 wt %, even more preferably from 0 to 15 wt %, still more preferably from 0 to 10 wt %, to achieve the effects of the present invention to a sufficient extent.

If an unsaturated carboxylic acid is used, the acid is present in the monomer component subjected to the polymerization step in an amount of preferably from 0 to 30 wt %, more preferably from 0 to 20 wt %, even more preferably from 0 to 15 wt %, still more preferably from 0 to 10 wt %, to achieve the effects of the present invention to a sufficient extent.

If a monomer of general formula (3) is used, the monomer is present in the monomer component subjected to the polymerization step in an amount of preferably from 0 to 30 wt %, more preferably from 0 to 20 wt %, even more preferably from 0 to 15 wt %, still more preferably from 0 to 10 wt %, to achieve the effects of the present invention to a sufficient extent.

The polymerization reaction of a monomer composition whereby a polymer containing hydroxyl groups and ester groups in molecular chains is obtained preferably involves use of a solvent. Solution polymerization is especially preferred.

Polymerization temperature and time may vary depending on the type, relative amount, etc. of the monomer (monomer composition) being used. Preferably, polymerization temperature is from 0 to 150° C., and polymerization time is from 0.5 to 20 hours. More preferably, polymerization temperature is from 80 to 140° C., polymerization time is from 1 to 10 hours.

The solvent for the polymerization (polymerization solvent) is not limited in any particular manner. Examples include toluene-, xylene-, ethyl benzene-, and other aromatic hydrocarbon-based solvents; methylethyl ketone-, methylisobutyl ketone-, and other ketone-based solvents; tetrahydrofuran- and other ether-based solvents. These solvents may be used alone or in any combination. A solvent with too high a boiling point will leave large amounts of volatile components residing in the ultimately obtained lactone ring-containing polymer. The solvent preferably has a boiling point in the range of 50 to 200° C.

A polymerization initiator may be added in the polymerization reaction where necessary. The polymerization initiator is not limited in any particular manner. Examples include organic peroxides, such as cumene hydroperoxide, diisopropyl benzene hydroperoxide, di-t-butyl peroxide, lauroyl peroxide, benzoyl peroxide, t-butyl peroxy isopropyl carbonate, t-amyl peroxy isononanoate, and t-amyl peroxy-2-ethyl hexanoate; and azo compound, such as 2,2'-azobis(isobutyronitrile), 1,1'-azobis(cyclohexane carbonitrile), and 2,2'-azobis(2,4-dimethyl valeronitrile). These initiators may be used alone or in any combination. The polymerization initiator may be used in any amount as determined appropriately according to the combination of monomers being used, reaction conditions, and other factors.

In the polymerization, the concentration of the produced polymer present in the polymerization reaction mixture is preferably controlled not to exceed 75 wt % to prevent gelation of the reaction liquid. Specifically, if the concentration of the produced polymer in the polymerization reaction mixture exceeds 75 wt %, the polymerization solvent is preferably added to the polymerization reaction mixture as appropriate so that the concentration does not exceed 75 wt %. The concentration of the produced polymer present in the polymerization reaction mixture is more preferably 60 wt % or less, even more preferably 50 wt % or less. If the concentration of the polymer present in the polymerization reaction mixture is too low, productivity falls. The concentration of the polymer present in the polymerization reaction mixture is thus preferably 10 wt % or greater, more preferably 20 wt % or greater.

The polymerization solvent may be added to the polymerization reaction mixture in any manner. The polymerization solvent may be added continuously or intermittently. This control of the concentration of the produced polymer present in the polymerization reaction mixture enables better prevention of gelation of the reaction liquid. The gelation is sufficiently restrained even if the relative amount of the hydroxyl groups and ester groups in the molecular chains is increased to increase lactone ring content for heat resistance. The polymerization solvent added here may be of the same type as, or of a different type from, the solvent added at the onset of the polymerization reaction. Preferably, however, the solvent may be of the same type as the solvent at the onset of the polymerization reaction. In addition, a single type of polymerization solvent may be added or a mixture of plural types of polymerization solvents may be added.

The polymer obtained in the polymerization step discussed above contains ester groups (or hydroxyl groups and ester groups when the polymer is obtained by polymerization of a monomer containing a compound having a structure of general formula (2)) in molecular chains. The polymer has a weight-average molecular weight of preferably from 1,000 to 2,000,000, more preferably from 5,000 to 1,000,000, even more preferably from 10,000 to 500,000, still more preferably from 50,000 to 500,000.

By heating in the subsequent lactone cyclization condensation step, a lactone ring structure can be introduced to the polymer obtained by polymerization of a monomer containing a compound having a structure of general formula (2), yielding a lactone ring-containing polymer.

The polymerization reaction mixture obtained upon the termination of the polymerization step typically contains a solvent/solvents, as well as the produced polymer. When the polymer is converted into a lactone ring-containing polymer, the solvent does not need to be completely removed to obtain a polymer solid. Preferably, the polymer is obtained as a mixture with the solvent and subjected to the lactone cyclization condensation step. Alternatively, if necessary, the polymer is removed as a solid, and a suitable solvent is re-added in the subsequent lactone cyclization condensation step.

A lactone ring structure is introduced to the polymer by heating. In this reaction, the hydroxyl groups and ester groups present in molecular chains of the polymer are cyclized/condensed to form a lactone ring structure. Alcohol is produced as a byproduct in the cyclization condensation. The lactone ring structure, formed in the molecular chains of the polymer (in the main skeleton of the polymer), gives the polymer high heat resistance. An insufficient reactivity for the cyclization condensation reaction introducing the lactone ring structure is undesirable for the following reasons. If the reactivity is low, the heat resistance may not be improved sufficiently, and a condensation reaction may occur in the middle of molding due to heating involved in the molding process. In the latter case, the byproduct alcohol may form bubbles and silver streaks which will remain in the film.

The lactone ring-containing polymer obtained in the lactone cyclization condensation step preferably has a lactone ring structure of general formula (1).

The polymer may be heated by any method; any publicly known method may be used. For example, the polymerization reaction mixture, taken out straightly from the polymerization step (therefore, containing the solvent), may be heated. Alternatively, the mixture, containing the solvent, may be heated using a suitably chosen ring-closing catalyst. In another example, the heating may be carried out in a heating furnace or reaction device equipped with a vacuum device or devolatilization device which removes volatile components or in an extruder equipped with such a devolatilization device.

Acrylic polymers other than the polymer may also be present in the cyclization condensation reaction. The cyclization condensation reaction may be carried out, where necessary, using a catalyst. The catalyst may be one of those which are popularly used in cyclization condensation reaction, including esterification catalysts and transesterification catalysts (e.g., p-toluene sulfonic acid). The catalyst may also be an organic carboxylic acid, such as acetic acid, propionic acid, benzoic acid, acrylic acid, or methacrylic acid. Other available choices include the basic compounds, organic carboxylates, and carbonates that are disclosed in Japanese Unexamined Patent Publications No. 61-254608/1986 (Tokukaisho 61-254608) and No. 61-261303/1986 (Tokukaisho 61-261303).

An organophosphorous compound is preferably used as a catalyst in the cyclization condensation reaction. The use of an organophosphorous compound as a catalyst improves cyclization condensation reactivity and greatly lowers coloring of the obtained lactone ring-containing polymer. If a devolatilization step (detailed later) is implemented together, the use of an organophosphorous compound as a catalyst also restrains potential molecular weight decreases, giving the product an excellent mechanical strength.

Examples of the organophosphorous compound which can be used as a catalyst in the cyclization condensation reaction include alkyl(aryl)phosphonous acids, such as methyl phosphonous acid, ethyl phosphonous acid, and phenyl phosphonous acid, (including their tautomers, i.e. alkyl(aryl) phosphinic acids), their diesters, and monoesters; dialkyl (aryl)phosphinic acids, such as dimethyl phosphinic acid, diethyl phosphinic acid, diphenyl phosphinic acid, phenyl methyl phosphinic acid, and phenyl ethyl phosphinic acid, and their esters; alkyl(aryl)phosphonic acids, such as methyl phosphonic acid, ethyl phosphonic acid, trifluoromethyl phosphonic acid, and phenyl phosphonic acid, and their diesters and monoesters; alkyl(aryl)phosphinous acids, such as methyl phosphinous acid, ethyl phosphinous acid, and phenyl phosphinous acid, and their esters; phosphite diesters, phosphite monoesters, and phosphite triesters, such as methyl phosphite, ethyl phosphite, phenyl phosphite, dimethyl phosphite, diethyl phosphite, diphenyl phosphite, trimethyl phosphite, triethyl phosphite, and triphenyl phosphite; phosphate diesters, phosphate monoesters and triesters, such as methyl phosphate, ethyl phosphate, 2-ethylhexyl phosphate, isodecyl phosphate, lauryl phosphate, stearyl phosphate, isostearyl phosphate, phenyl phosphate, dimethyl phosphate, diethyl phosphate, di-2-ethylhexyl phosphate, diisodecyl phosphate, dilauryl phosphate, distearyl phosphate, diisostearyl phosphate, diphenyl phosphate, trimethyl phosphate, triethyl phosphate, triisodecyl phosphate, trilauryl phosphate, tristearyl phosphate, triisostearyl phosphate, and triphenyl phosphate; monoalkyl(aryl)phosphines, dialkyl(aryl)phosphine, and trialkyl(aryl)phosphines, such as methyl phosphine, ethyl phosphine, phenyl phosphine, dimethyl phosphine, diethyl phosphine, diphenyl phosphine, trimethyl phosphine, triethyl phosphine, and triphenyl phosphine; alkyl (aryl)phosphine halides, such as methyl phosphine dichloride, ethyl phosphine dichloride, phenyl phosphine dichloride, dimethyl phosphine chloride, diethyl phosphine chloride, and diphenyl phosphine chloride; monoalkyl(aryl) phosphine oxides, dialkyl(aryl)phosphine oxides, and trialkyl (aryl)phosphine oxides, such as methyl phosphine oxide, ethyl phosphine oxide, phenyl phosphine oxide, dimethyl phosphine oxide, diethyl phosphine oxide, diphenyl phosphine oxide, trimethyl phosphine oxide, triethyl phosphine oxide, and triphenyl phosphine oxide; tetraalkyl(aryl)phosphonium halides, such as tetramethyl phosphonium chloride, tetraethyl phosphonium chloride, and tetraphenyl phosphonium chloride. For high catalyst activity and low coloring, preferred examples are alkyl(aryl)phosphonous acids, phosphite diesters and monoesters, phosphate diesters, phosphate monoesters, and alkyl(aryl)phosphonic acids; particularly preferred ones are alkyl(aryl)phosphonous acids, phosphite diesters and monoesters, phosphate diesters, and phosphate monoesters; more preferred ones are alkyl(aryl)phosphonous acids, phosphate diesters, and phosphate monoesters. These organophosphorous compounds may be used alone or in any combination.

The amount of the catalyst for the cyclization condensation reaction is not limited in any particular manner. The amount is preferably from 0.001 to 5 wt %, more preferably from 0.01 to 2.5 wt %, even more preferably from 0.01 to 1 wt %, still more preferably from 0.05 to 0.5 wt %, with respect to the polymer. Any values outside these ranges are undesirable for the following reasons. If the catalyst is used in an amount below 0.001 wt %, the reactivity for the cyclization condensation reaction may not sufficiently improved. On the other hand, if the amount exceeds 5 wt %, the excessive use may possibly induce coloring and make it difficult to melt and dilute the polymer due to crosslinking in the polymer.

The catalyst may be added at any time: for example, at the onset of the reaction, halfway through the reaction, or both.

The cyclization condensation reaction is preferably carried out in the presence of a solvent and along with a devolatilization step. For example, the devolatilization step may be implemented throughout the cyclization condensation reaction or only in part of the course of the cyclization condensation reaction. By implementing the devolatilization step during the cyclization condensation reaction, alcohol, a byproduct of the condensation cyclization reaction, is forced out of the system by devolatilization, moving the equilibrium toward products.

The devolatilization step refers to a step of removing solvents, residual monomers, and other volatile components as well as alcohol, which is a byproduct of the cyclization condensation reaction introducing the lactone ring structure. The step may be carried out, where necessary, at high temperature under a reduced pressure. If the removal is inadequate, the resultant resin contains a large quantity of residual volatile components which could cause the resin to change color or to suffer from bubbles, silver streaks, and other defects due to changes in properties in molding.

If the devolatilization step is implemented throughout the cyclization condensation reaction, any device may be used for the process. For effective implementation of the present invention, however, it is preferable to use a vent-type extruder or a devolatilization device built around a heat exchanger and a devolatilization vessel. Also preferable is a combination of the devolatilization device and the extruder connected in series. It is more preferable to use a vent-type extruder or a devolatilization device built around a heat exchanger and a devolatilization vessel.

If a devolatilization device built around a heat exchanger and a devolatilization vessel is used, the reaction temperature is preferably from 150 to 350° C., more preferably from 200 to 300° C. If the reaction temperature is below 150° C., the cyclization condensation reaction may not proceed sufficiently, possibly producing a large amount of residual volatile components. If the temperature exceeds 350° C., the excess heat may induce coloring and decomposition.

If a devolatilization device built around a heat exchanger and a devolatilization vessel is used, the reaction pressure is preferably from 931 to 1.33 hPa (700 to 1 mmHg), more preferably from 798 to 66.5 hPa (600 to 50 mmHg). If the pressure exceeds 931 hPa, volatile components, including alcohol, are likely to remain; if the pressure is below 1.33 hPa, the invention becomes difficult to implement for industrial purposes. Both situations are problematic.

If a vent-type extruder is used, the extruder may be equipped with one vent or plural vents. The extruder is preferably equipped with plural vents.

If a vent-type extruder is used, the reaction temperature is preferably from 150 to 350° C., more preferably 200 to 300° C. If the temperature is below 150° C., the cyclization condensation reaction may not proceed sufficiently, possibly producing a large amount of residual volatile components. If the temperature exceeds 350° C., the excess heat may induce coloring and decomposition.

If a vent-type extruder is used, the reaction pressure is preferably from 931 to 1.33 hPa (700 to 1 mmHg), more preferably from 798 to 13.3 hPa (600 to 10 mmHg). If the pressure exceeds 931 hPa, volatile components, including alcohol, are likely to remain; if the pressure is below 1.33 hPa, the invention becomes difficult to implement for industrial purposes. Both situations are problematic.

If the devolatilization step is implemented throughout the cyclization condensation reaction, the physical properties of the produced lactone ring-containing polymer may deteriorate under harsh heating conditions (detailed later). Therefore, the devolatilization step is preferably implemented in a vent-type extruder, etc. using one of the catalysts listed above for dealcoholization reaction under conditions that are as mild as possible.

If the devolatilization step is implemented throughout the cyclization condensation reaction, the polymer obtained in the polymerization step is preferably introduced to the cyclization condensation reaction device system together with a solvent. When that is the case, the mixture may be fed once again to the vent-type extruder or a like reaction device system if necessary.

The devolatilization step may be implemented only in part of the course of the cyclization condensation reaction, not throughout the course. For example, the device in which the polymer has been manufactured is heated up further so that the cyclization condensation reaction can proceed to some extent in advance while implementing a part of the devolatilization step where necessary. Subsequently, the simultaneous devolatilization/cyclization condensation reaction is implemented to complete the reaction.

If the devolatilization step is implemented throughout the cyclization condensation reaction as described above, when, for example, the polymer is heated in a twin screw extruder at high temperatures (close to 250° C. or even beyond), the polymer may partly decompose before the start of the cyclization condensation reaction due to different thermal history. The decomposition can possibly degrade the physical properties of the produced lactone ring-containing polymer. These problems are alleviated by carrying out the cyclization condensation reaction to some extent prior to the simultaneous devolatilization/cyclization condensation reaction. This arrangement is desirable because it makes reaction conditions milder for the remaining course of the cyclization condensation reaction, thereby restraining deterioration of the physical properties of the produced lactone ring-containing polymer. More preferably, the devolatilization step is started some time after the cyclization condensation reaction is started. In other words, the hydroxyl and ester groups present in the molecular chains of the polymer obtained in the polymerization step are cyclized/condensed in advance to raise the cyclization condensation reactivity by some amount before proceeding directly to the simultaneous devolatilization/cyclization condensation reaction. In a specific preferred example, the cyclization condensation reaction is allowed to proceed to some reactivity in advance in a vessel-type reaction container in the presence of a solvent. Thereafter, the cyclization condensation reaction is completed in a reaction container equipped with a devolatilization device, for example, a vent-type extruder or a devolatilization device built around a heat exchanger and a devolatilization vessel. In this particular example, a catalyst is preferably present for the cyclization condensation reaction.

This method of cyclizing/condensing the hydroxyl and ester groups present in the molecular chains of the polymer obtained in the polymerization step in advance to raise the cyclization condensation reactivity by some amount before proceeding directly to the simultaneous devolatilization/cyclization condensation reaction as described above is desirable to obtain the lactone ring-containing polymer. The method raises the cyclization condensation reactivity, which in turn leads to a lactone ring-containing polymer with high glass transition temperature and excellent heat resistance. As a measure of the cyclization condensation reactivity here, the weight reduction ratio measured by dynamic TG at 150 to 300° C. (detailed later with examples) is preferably not more than 2%, more preferably not more than 1.5%, even more preferably not more than 1%.

Any reaction container may be used in the preliminary cyclization condensation reaction implemented prior to the simultaneous devolatilization/cyclization condensation reaction. Preferred examples include an autoclave, a vessel-type reaction container, and a devolatilization device built around a heat exchanger and a devolatilization vessel. Another example is a vent-type extruder which is also suitable for the simultaneous devolatilization/cyclization condensation reaction. An autoclave and a vessel-type reaction container are more preferred examples than others. However, even when a vent-type extruder or like reaction container is used, the cyclization condensation reaction can proceed under similar conditions to those in an autoclave or a vessel-type reaction container, if ventilation is not done at all or is done but to a limited extent, or if temperature conditions, barrel conditions, screw shape, screw operating conditions, etc. are adjusted.

The preliminary cyclization condensation reaction implemented prior to the simultaneous devolatilization/cyclization condensation reaction is actually carried out, preferably, by one of these three methods: (i) A catalyst is added to the mixture containing the polymer obtained in the polymerization step and a solvent, and the resultant mixture is heated. (ii) The mixture is heated without any catalyst. (iii) Either (i) or (ii) carried out under pressure.

This mixture, introduced to the cyclization condensation reaction in the lactone cyclization condensation step, may refer to either the polymerization reaction mixture as it is obtained from the polymerization step or the remaining of the polymerization reaction mixture when the solvent(s) is/are removed and to which a solvent suitable for the cyclization condensation reaction is subsequently added.

The solvent which can be re-added in the preliminary cyclization condensation reaction implemented prior to the simultaneous devolatilization/cyclization condensation reaction is not limited in any particular manner. Examples include aromatic hydrocarbons, such as toluene, xylene, and ethyl benzene; ketones, such as methylethyl ketone and methylisobutyl ketone; chloroform; DMSO; and tetrahydrofuran. Preferred solvents are the same types of solvents as those which can be used in the polymerization step.

The catalyst added in method (i) may be, for example, a commonly used esterified catalyst or transesterification catalyst (e.g. p-toluene sulfonic acid), basic compound, organic carboxylate, or carbonate. The organophosphorous compounds listed above are preferably used in the present invention.

The catalyst may be added at any time: for example, at the onset of the reaction, halfway through the reaction, or both. The catalyst may be added in any quantity and preferably 0.001 to 5 wt %, more preferably 0.01 to 2.5 wt %, even more preferably 0.01 to 1 wt %, still more preferably 0.05 to 0.5 wt %, of the polymer. The heating temperature and time for method (i) is not limited in any particular manner. The heating temperature is preferably not lower than room temperature, more preferably not lower than 50° C. The heating time is preferably 1 to 20 hours, more preferably 2 to 10 hours. If the heating temperature is too low or the heating time is too short, the cyclization condensation reactivity decreases. This is not desirable. On the other hand, if the heating time is too long, the resin may take on a color or decompose. This is not desirable either.

Method (ii) may be carried out by, for example, heating the polymerization reaction mixture as is obtained in the polymerization step in a pressure resistant vessel. The heating temperature is preferably not lower than 100° C., more preferably not lower than 150° C. The heating time is preferably 1 to 20 hours, more preferably 2 to 10 hours. If the heating temperature is too low or the heating time is too short, the cyclization condensation reactivity decreases. This is not desirable. On the other hand, if the heating time is too long, the resin may take on a color or decompose. This is not desirable either.

Both methods (i) and (ii) can be carried out under pressure depending on conditions, without expecting any problems. Some of the solvent may spontaneously evaporate in the preliminary cyclization condensation reaction implemented prior to the simultaneous devolatilization/cyclization condensation reaction, without expecting any problems.

The weight reduction ratio measured by dynamic TG at 150 to 300° C. when the preliminary cyclization condensation reaction implemented prior to the simultaneous devolatilization/cyclization condensation reaction terminates, that is, immediately before the devolatilization step starts, is preferably not more than 2%, more preferably not more than 1.5%, even more preferably not more than 1%. If the weight reduction ratio exceeds 2%, the cyclization condensation reactivity could not reach a sufficient level even by immediately carrying out the simultaneous devolatilization/cyclization condensation reaction, possibly degrading the physical properties of the obtained lactone ring-containing polymer. Acrylic polymers other than the polymer may also be present in the cyclization condensation reaction.

If the hydroxyl and ester groups present in the molecular chains of the polymer obtained in the polymerization step are cyclized/condensed in advance to raise the cyclization condensation reactivity by some amount before proceeding directly to the simultaneous devolatilization/cyclization condensation reaction, the simultaneous devolatilization/cyclization condensation reaction may be carried out without separating from the solvent the polymer obtained in the cyclization condensation reaction implemented in advance (polymer in which at least some of the hydroxyl and ester groups present in the molecular chains have been cyclized/condensed). Alternatively, the simultaneous devolatilization/cyclization condensation reaction may be carried out after separating the polymer (polymer in which at least some of the hydroxyl and ester groups present in the molecular chains have been cyclized/condensed) and subsequently re-adding the solvent and carrying out other processes, where necessary.

The devolatilization step does not always need to terminate simultaneously with the cyclization condensation reaction. The step may terminate some time after the termination of the cyclization condensation reaction.

The obtained lactone ring-containing polymer has a weight-average molecular weight of preferably from 1,000 to 2,000,000, more preferably from 5,000 to 1,000,000, even more preferably from 10,000 to 500,000, still more preferably from 50,000 to 500,000.

The lactone ring-containing polymer has a weight reduction ratio, as measured by dynamic TG at 150 to 300° C., of preferably not more than 1%, more preferably not more than 0.5%, even more preferably not more than 0.3%.

The lactone ring-containing polymer has a high cyclization condensation reactivity and hence prevents bubbles, silver streaks, or like defects from appearing in molded films. The high cyclization condensation reactivity enables sufficient introduction of the lactone ring structure to the polymer, giving the resultant lactone ring-containing polymer sufficiently high heat resistance.

The lactone ring-containing polymer has a yellowness index (YI) in a 15 wt % chloroform solution of preferably not more than 6, more preferably not more than 3, even more preferably not more than 2, still most preferably not more than 1. If the yellowness index (YI) exceeds 6, the polymer is no longer transparent due to the coloring and may not be useable for intended applications.

The lactone ring-containing polymer has a 5%-weight-reduction temperature, as obtained by heat weight analysis (TG), of preferably not lower than 330° C., more preferably not lower than 350° C., even more preferably not lower than 360° C. The 5%-weight-reduction temperature as obtained by heat weight analysis (TG) is a thermostability indicator. If the thermostability indicator is less than 330° C., the polymer may not have sufficient thermostability.

The lactone ring-containing polymer has a glass transition temperature (Tg) of preferably from 110° C. to 200° C., more preferably from 115° C. to 200° C., even more preferably from 120° C. to 200° C., still more preferably from 125° C. to 190° C., most preferably from 130° C. to 180° C.

The lactone ring-containing polymer contains residual volatile components in a total amount of preferably not more than 1,500 ppm, more preferably not more than 1,000 ppm. If the total amount of the residual volatile components exceeds 1,500 ppm, the excess amount may cause changes in color, foaming, silver streaks, and other defects due partly to changes in properties in molding.

After being molded by injection molding, the lactone ring-containing polymer has a total light transmittance, as measured by a method compliant to ASTM-D-1003, of preferably not less than 85%, more preferably not less than 90%, even more preferably not less than 91%. The total light transmittance is a measure of transparency. If the total light transmittance is less than 85%, the transparency could be so low that the polymer may not be useable for intended applications.

[Non-Acrylic Polymer Components]

The retardation film in accordance with the present invention only needs to contain an acrylic polymer as a primary component. The film may contain components other than acrylic polymers. The components other than the primary component, i.e. acrylic polymers, are not limited in any particular manner.

Examples of polymers other than acrylic polymers include, as elastic organic fine particles and other polymers, olefinic polymers, such as polyethylene, polypropylene, ethylene/propylene copolymers, and poly(4-methyl-1-pentene); halogen polymers, such as vinyl chloride and chlorinated vinyl resin; styrene polymer, such as polystyrene, styrene-methyl methacrylate copolymers, styrene-acrylonitrile copolymers, and acrylonitrile-butadiene-styrene block copolymers; polyesters, such as polyethylene terephthalate, polybutylene terephthalate, and polyethylene naphthalate; polyamides, such as nylon 6, nylon 66, and nylon 610; polyacetal; polycarbonate; polyphenylene oxide; polyphenylene sulfide; polyether ether ketone; poly sulfone; polyether sulfone; polyoxybenzylene; and polyamideimide.

When the acrylic polymer is the lactone ring-containing polymer, the film shows positive birefringence (positive retardation). Therefore, among the examples, vinyl chloride, polycarbonate, and other polymers containing aromatic rings in the main chain which shows positive birefringence (positive retardation) are preferred because these polymers enhance positive birefringence (positive retardation).

The retardation film in accordance with the present invention contains the elastic organic fine particles, if at all, in an amount of preferably 5 to 50 wt %, more preferably 10 to 40 wt %, even more preferably 15 to 30 wt %. If the elastic organic fine particles are present in an amount of less than 5 wt %, desired flexibility may not be obtained. If the elastic organic fine particles are present in excess of 50 wt %, transparency may decrease due partly to aggregation of the elastic organic fine particles. Large amounts of unwanted byproducts may also be produced due to the same reason. The film may not be used as an optical film.

The retardation film in accordance with the present invention contains the other polymers in an amount of preferably 0 to 50 wt %, more preferably 0 to 40 wt %, even more preferably 0 to 30 wt %, still more preferably 0 to 20 wt %.

The retardation film in accordance with the present invention may contain a low molecular substance which shows the same sign as the sign of the birefringence of the acrylic polymer when added to the acrylic polymer to increase the retardation (alternatively described as the "retardation value" or simply the "retardation"). The low molecular substance generally refers to a molecular substance that has a molecular weight of not more than 5,000, preferably not more than 1,000. A specific example is the low molecular substance described in Japanese Patent No. 3,696,645.

When the acrylic polymer is the lactone ring-containing polymer, the film shows positive birefringence (positive retardation). Therefore, especially, stilbene, biphenyl, diphenyl acetylene, common liquid crystal substances, and other low molecular substances which show positive birefringence (positive retardation) are preferred because these substances enhance positive birefringence (positive retardation).

The retardation film in accordance with the present invention contains the low molecular substance in an amount of preferably 0 to 20 wt %, more preferably 0 to 10 wt %, even more preferably 0 to 5 wt %.

The retardation film in accordance with the present invention may contain other additives. Examples of such additives include hindered phenol-, phosphorous-, and sulfur-based oxidation inhibitors; stable agents, such as light resistant agents, weather resistant agents, and thermostable agents; reinforcement materials, such as glass and carbon fibers; ultraviolet absorption agents, such as phenyl salicylate, (2,2'-hydroxy-5-methylphenyl)benzotriazole, and 2-hydroxybenzophenone; near-infrared absorption agents; fire retardants, such as tris(dibromopropyl)phosphate, triallyl phosphate, and antimony oxide; charge inhibitors, such as anionic, cationic, and non-ionic surfactants; coloring agents, such as inorganic pigments, organic pigments, and dyes; organic and inorganic fillers; resin modification agents; organic and inorganic charge agents; plastic agents; lubricants; charge inhibitors; and fire retardants.

The other additives account for preferably 0 to 5 wt %, more preferably 0 to 2 wt %, even more preferably 0 to 0.5 wt %, of the retardation film in accordance with the present invention.

The following will describe elastic organic fine particles (hereinafter, "organic fine particles").

The retardation film in accordance with the present invention preferably contains the acrylic polymer as a primary component and also contains 5 wt % to 50 wt %, inclusive, organic fine particles which have an average particle diameter of from 0.01 μm to 1 μm, inclusive.

The organic fine particles preferably improve the flexibility (bending/folding endurance) and other physical properties of the acrylic polymer. To improve the flexibility of the acrylic polymer, the organic fine particles preferably has a crosslinked structure.

The organic fine particles having a crosslinked structure can be obtained by polymerizing, for example, a monomer composition containing a polyfunctional compound with two or more non-conjugate double bonds per molecule.

Examples of the polyfunctional compounds include divinyl benzene, allyl methacrylate, allyl acrylate, dicyclopentenyl methacrylate, dicyclopentenyl acrylate, 1,4-butanediol dimethacrylate, ethylene glycol dimethacrylate, triallyl cyanurate, triallyl isocyanurate, diallyl phthalate, diallyl malate, divinyl adipate, divinyl benzene ethylene glycol dimethacrylate, divinyl benzene ethylene glycol diacrylate, diethylene glycol dimethacrylate, diethylene glycol diacrylate, triethylene glycol dimethacrylate, triethylene glycol diacrylate, trimethylol propane trimethacrylate, trimethylol propane triacrylate, tetramethylol methane tetramethacrylate, tetramethylol methane tetraacrylate, dipropylene glycol dimethacrylate, and dipropylene glycol diacrylate. These compounds may be used alone or in any combination.

The structure obtained by polymerization of the polyfunctional compound(s) will hereinafter be referred to as the polyfunctional compound-derived structure. The organic fine particles may have a structure other than the polyfunctional compound-derived structure. The structure other than the polyfunctional compound-derived structure preferably contains polymer structural units (repeating structural units), constituting the acrylic polymer, which are obtained by polymerization of at least one of the (meth)acrylic esters, monomers containing hydroxyl groups, unsaturated carboxylic acids, and monomers of general formula (3).

The organic fine particles contains polymer structural units constituting the acrylic polymer. Therefore, the organic fine particles disperse better in the acrylic polymer. That improves the transparency of the film and also better restrains unwanted byproducts from being produced due partly to aggregation of the organic fine particles, which in turn makes it possible to complete the filtering step quickly when the polymer is molded into the retardation film.

The organic fine particles, when obtained by polymerization of a monomer composition containing the polyfunctional compound(s), shows crosslinked elasticity. The elasticity improves the flexibility of the retardation film obtained by molding and imparts excellent moldability into film and bending/folding endurance to the retardation film.

The organic fine particles have a multilayer structure of cores and shells. The core is particulate polymer with an average diameter of 0.01 μm to 1 μm, inclusive. The shell is formed covering the core by polymerization of (meth)acrylic ester. The core-to-shell weight ratio is preferably from 20:80 to 80:20. The shell preferably contains 5 wt % to 50 wt %, inclusive, monomer structural units of 2-(hydroxymethyl) acrylic ester. Since the organic fine particles have a core/shell structure, the particles more uniformly disperse in the acrylic polymer. The organic fine particles in accordance with the present embodiment preferably have a crosslinked structure with an average particle diameter of 0.01 μm to 1 μm, inclusive, and contains 1 wt % to 100 wt %, inclusive, monomer structural units of 2-(hydroxymethyl)acrylic ester.

The 2-(hydroxymethyl)acrylic ester is preferably a compound with a structure of general formula (2) above, more preferably methyl 2-(hydroxymethyl)acrylate.

The organic fine particles preferably have the polyfunctional compound-derived structure only in the central part (core) and a structure highly compatible with the acrylic polymer constituting the retardation film in the part surrounding the central part (shell). Owing to the construction, the organic fine particles can more uniformly disperse in the acrylic polymer and better restrains unwanted byproducts from being produced due partly to aggregation of the organic fine particles, which in turn makes it possible to complete the filtering step quickly when the polymer is molded into the retardation film mold. The organic fine particles having the core/shell structure are obtainable by, for example, graft polymerization of at least one of the (meth)acrylic esters, monomers containing hydroxyl groups, unsaturated carboxylic acids, and monomers of general formula (3), using the reactive functional groups (double bonds) remaining unreacted in the polymerization of the organic fine particles as graft sites. The following will describe the shells and cores in the core/shell structure.

The shells is not limited in any particular manner so long as the section has a structure that is highly compatible with the acrylic polymer that is part of the retardation film. Examples of such a structure include, if the acrylic polymer is the lactone ring-containing polymer, a structure obtained by polymerization of a monomer composition of methyl 2-(hydroxymethyl)acrylate (hereinafter, "MHMA") and methyl methacrylate (hereinafter, "MMA") (hereinafter, "MHMA/MMA structure"), a structure obtained by polymerization of a monomer composition of cyclohexyl methacrylate (hereinafter, "CHMA") and MMA (hereinafter, "CHMA/MMA structure"), a structure obtained by polymerization of a monomer composition of benzyl methacrylate (hereinafter, "BzMA") and MMA (hereinafter, "BzMA/MMA structure"), a structure obtained by polymerization of a monomer composition of 2-hydroxyethyl methacrylate (hereinafter, "HEMA") and MMA (hereinafter, "HEMA/MMA structure"), and a structure obtained by polymerization of a monomer composition of acrylonitrile (hereinafter, "AN") and styrene (hereinafter, "St") (hereinafter, "AN/St structure").

If the shells has a MHMA/MMA structure, the MHMA:MMA ratio is preferably from 5:95 to 50:50, more preferably from 10:90 to 40:60. Within these ranges, the structure has such good compatibility with the lactone ring-containing polymer that the organic fine particles can uniformly disperse in the lactone ring-containing polymer. If the shell has a MHMA/MMA structure, the shell preferably has a lactone ring structure. The lactone ring structure can be introduced by lactonizing after forming the shell.

If the shell has a CHMA/MMA structure, the CHMA:MMA ratio is preferably from 5:95 to 50:50, more preferably from 10:90 to 40:60. Within these ranges, the structure has such good compatibility with the lactone ring-containing polymer that the organic fine particles can uniformly disperse in the lactone ring-containing polymer.

If the shell has a BzMA/MMA structure, the BzMA:MMA ratio is preferably from 10:90 to 60:40, more preferably from 20:80 to 50:50. Within these ranges, the structure has such good compatibility with the lactone ring-containing polymer that the organic fine particles can uniformly disperse in the lactone ring-containing polymer.

If the shell has a HEMA/MMA structure, the HEMA:MMA ratio is preferably from 2:98 to 50:50, more preferably from 5:95 to 40:60. Within these ranges, the structure has such good compatibility with the lactone ring-containing polymer that the organic fine particles can uniformly disperse in the lactone ring-containing polymer.

If the shell has an AN/St structure, the AN:St ratio is preferably from 5:95 to 50:50, more preferably from 10:90 to 40:60. Within these ranges, the structure has such good compatibility with the lactone ring-containing polymer that the organic fine particles can uniformly disperse in the lactone ring-containing polymer.

When the acrylic polymer is the lactone ring-containing polymer, the film shows positive birefringence (positive retardation). Therefore, among the examples, the shell with a CHMA/MMA structure, a BzMA/MMA structure, or a MHMA/MMA structure, if having a MHMA/MMA structure, more preferably contains a lactone ring structure because the shell hardly reduce positive birefringence.

The cores are not limited in any particular manner so long as the cores have a structure which improves the flexibility of the acrylic polymer constituting the retardation film. An example is a crosslinked structure. A preferred crosslinked structure is a crosslinked rubber structure.

The crosslinked rubber structure refers to a rubber structure in which main chains composed of a polymer having a glass transition point in the range of $-100°$ C. to $+25°$ C. are crosslinked by a polyfunctional compound to impart elasticity. Examples of the crosslinked rubber structure include the structures (repeating structural units) of acrylic rubbers, polybutadiene rubbers, and olefinic rubbers.

An example of this particular crosslinked structure is the polyfunctional compound-derived structure mentioned earlier. Among polyfunctional compounds, 1,4-butanediol dimethacrylate, diethylene glycol dimethacrylate, trimethylolpropane trimethacrylate, divinyl benzene, allyl methacrylate, allyl acrylate, and dicyclopentenyl methacrylate are more preferred than others.

The amount of the polyfunctional monomer used in manufacture of the cores is preferably from 0.01 to 15 wt %, more preferably from 0.1 to 10 wt %, with respect to the monomer composition used. By using the polyfunctional monomer within these ranges, the obtained film shows good bending/folding endurance.

The core-to-shell weight ratio is preferably from 20:80 to 80:20, more preferably from 40:60 to 60:40. If the cores account for less than 20 wt %, the film made from the obtained organic fine particles tends to exhibit poor bending/folding endurance. If the proportion exceeds 80 wt %, the film tends to show poor hardness and moldability.

The cores may or may not have a crosslinked structure. Similarly, the shells may or may not have a crosslinked structure. Preferably, only the cores have a crosslinked structure, and the shells do not have a crosslinked structure.

The organic fine particles has an average diameter of preferably from 0.01 to 1 µm, more preferably from 0.03 to 0.5 µm, even more preferably from 0.05 to 0.3 µm. If the average diameter is less than 0.01 µm, the fabricated film tends to have insufficient flexibility. If the average diameter exceeds 1 µm, the organic fine particles tend to clog the filter in a filtering step in the manufacture of the film. The diameter of the organic fine particles may be measured with a commercially available particle size distribution measuring instrument (for example, Submicron Particle Sizer NICOMP 380 manufactured by NICOMP).

The method of manufacturing the organic fine particles is not limited in any particular manner. The organic fine particles may be manufactured by polymerizing the monomer composition mentioned earlier in one or plural stages by conventional, publicly known emulsion polymerization, emulsion/suspension polymerization, suspension polymerization, bulk polymerization, or solution polymerization. Emulsion polymerization is more desirable than the others.

If the organic fine particles are manufactured by emulsion polymerization, the polymerization liquid after the emulsion polymerization is subjected to salting out or reprecipitation to have the organic fine particles aggregate. The aggregated particles are filtered out and washed. After the washing, the organic fine particles are dried and mixed with an acrylic polymer, to obtain a polymer composition which is a raw material for the retardation film. Alternatively, the organic fine particles may not be dried after the washing. The obtained cake of organic fine particles is re-dispersed in an organic solvent, such as MIBK (methylisobutyl ketone). Then, either an acrylic polymer is dissolved in the re-dispersion liquid or an acrylic polymer solution (a solution of an acrylic polymer dissolved in an organic solvent) is mixed with the re-dispersion liquid. Thereafter, water and/or the organic solvent are removed by devolatilization to obtain a polymer composition which is a raw material for the retardation film.

The polymerization initiator for use in the polymerization of the organic fine particles may be, for example, a conventional, publicly known organic peroxide, an inorganic peroxide, and an azo compound. Specific examples include organic peroxides, such as t-butylhydroperoxide, 1,1,3,3-tetramethylbutylhydroperoxide, succinate peroxide, peroxy maleate t-butyl ester, cumene hydroperoxide, and benzoyl peroxide; inorganic peroxides, such as potassium peroxide and sodium peroxide; and oil-soluble initiators, such as azobis(2-methyl propionamidine) dihydrochloride and azobisisobutyronitrile. These initiators may be used alone or in any combination.

The polymerization initiators may be used as an ordinary, redox-type initiator in combination with a reducing agent. Examples of such a reducing agent include sodium sulfite, sodium thiosulfate, sodium formaldehyde sulfoxylate, ascorbic acid, hydroxyacetonic acid, ferrous sulfate, and a complex of ferrous sulfate and disodium dihydrogen ethylenediaminetetraacetate.

The organic peroxide may be added as is to the polymerization system. Alternatively, it may be added after being mixed with a monomer, after being dispersed in an aqueous solution of an emulsifier, or by using any other publicly known method. For better transparency, the organic peroxide is preferably added after being mixed with a monomer or after being dispersed in an aqueous solution of an emulsifier.

The organic peroxide, for better polymerization stability and particle diameter control, is preferably used in combination with an inorganic reducing agent (e.g. divalent iron salt) and/or an organic reducing agent (e.g. sodium formaldehyde sulfoxylate, reducing sugar, and ascorbic acid) as a redox initiator.

The surfactant used in the emulsion polymerization is not limited in any particular manner; any conventional, publicly known surfactant prepared for emulsion polymerization may be used. Specific examples include anionic surfactants (e.g. sodium alkylsulfonate, sodium alkylbenzene sulfonate, sodium dioctylsulfosuccinate, sodium laurylsulfate, and sodium salts of fatty acid) and non-ionic surfactants (e.g. reaction products from alkyl phenol/aliphatic alcohol and propylene oxide/ethylene oxide). These surfactants may be used alone or in any combination. An alkyl amine salt or like cationic surfactant may also be used where necessary.

The obtained latex of organic fine particles can be separated and collected by ordinary solidification, washing, and drying, or alternatively, spray dry, freeze dry, or a like process.

A single type of the organic fine particles may be contained in the retardation film. Alternatively, two or more types may be contained.

[Retardation Film]

The retardation film in accordance with the present invention is obtained by mixing an acrylic polymer (primary component) with other polymers, additives, etc. as necessary by a conventional, publicly known mixing method and molding the mixture into a film. The film may be stretched to obtain a stretched film. It is important to orient molecular chains in the retardation film to give retardation to the film. Any method may be used so long as the method can orient the molecular chains. Examples include stretching, rolling, withdrawing, and other various methods. Among these methods, stretching is preferably used to give the film retardation due to its high production yield.

The mixture may be molded into a film by any publicly known film molding method, such as solution casting (solution flow casting), melt extrusion, calendering, and compression molding. Of these examples, solution casting (solution flow casting) and melt extrusion are preferred.

Examples of the solvent used in the solution casting (solution flow casting) include chlorine-based solvents; such as chloroform and dichloromethane; aromatic-based solvents, such as toluene, xylene, benzene, and mixtures of these substances; alcohol-based solvents, such as methanol, ethanol, isopropanol, n-butanol, and 2-butanol; ethylene glycol monomethylether; ethylene glycol monoethylether; ethylene glycol monobutylether; dimethylformamide; dimethyl sulfoxide; dioxane; cyclohexanone; tetrahydrofuran; acetone; ethyl acetate; and diethylether. These solvents may be used alone or in any combination.

The device used for the solution casting (solution flow casting) may be, for example, a drum-type casting machine, a band-type casting machine, and a spin coater.

The melt extrusion may be carried out by, for example, a T-die method or an inflation method. In these cases, the film is molded at preferably 150 to 350° C., more preferably 200 to 300° C.

The stretching method to obtain the retardation film in accordance with the present invention may be any conventional, publicly known stretching method. Examples include uniaxial stretching, such as free-width uniaxial stretching and fixed-width uniaxial stretching; and biaxial stretching, such as sequential biaxial stretching and simultaneous biaxial stretching. In another example of stretching, a shrinking film is attached to each or one side of the film upon film stretching to form a laminate of films. The laminate is heat stretched to obtain a birefringent film in which some molecules orient in the stretching direction and others orient in the thickness direction by inducing a shrinkage force in the film in a direction perpendicular to the stretching direction. Biaxial stretching is preferable because the method provides improved bending/folding endurance. Simultaneous biaxial stretching is especially preferable because the method provides improved bending/folding endurance in two given orthogonal directions in the film plane. Sequential biaxial stretching is especially preferable because the method readily provides both improved bending/folding endurance in two given orthogonal directions in the film plane and large in-plane retardations. An example of the two given orthogonal directions in the film plane is the direction parallel to the slow axis in the film plane and the direction perpendicular to the slow axis in the film plane. The stretching ratio, stretching temperature, stretching rate, and other stretching conditions may be set appropriately according to desired retardations and desired bending/folding endurance and not limited in any particular manner.

Free-width uniaxial stretching is preferable because the method provides a retardation film such that $nx>ny=nz$ or $nx=nz>ny$, where $nx$ is the refractive index along the direction of the slow axis in the film plane, $ny$ is the refractive index perpendicular to $nx$ in the film plane, and $nz$ is the refractive index in the film thickness direction. Biaxial stretching is preferable because the method provides a retardation film such that $nx=ny>nz$ or $nx=ny<nz$. Stretching by which a shrinkage force is induced in the film in a direction perpendicular to the stretching direction is preferable because the method provides a retardation film such that $nx>ny$ and $0<(nx-nz)/(nx-ny)<1$.

Examples of a device used for the stretching include roll stretchers and tenter-type stretchers. Compact stretching devices designed for experimental use may also be used: e.g. the tension tester, the uniaxial stretcher, the sequential biaxial stretcher, and the simultaneous biaxial stretcher. The retardation film in accordance with the present invention can be obtained using any of these devices.

The stretching temperature is preferably near the glass transition temperature of the polymer which is a raw material for the film or near the glass transition temperature of the pre-stretching film composed primarily of an acrylic polymer. Specifically, the stretching temperature is preferably from (Glass Transition Temperature−30)° C. to (Glass Transition Temperature+50)° C., more preferably from (Glass Transition Temperature−20)° C. to (Glass Transition Temperature+20)° C., even more preferably from (Glass Transition Temperature−10)° C. to (Glass Transition Temperature+10)° C. If the stretching temperature is below (Glass Transition Temperature−30)° C., the stretching ratio is too low, which is not desirable. If the stretching temperature exceeds (Glass Transition Temperature+50)° C., the resin becomes flowable, making stable stretching impossible. This is again not desirable.

The stretching ratio defined in terms of area ratio is preferably from 1.1 to 25, more preferably from 1.2 to 10, even more preferably from 1.3 to 5. If the stretching ratio is less than 1.1, the stretching is not accompanied by achievement of desired retardation and improvement of toughness, which is not desirable. If the stretching ratio exceeds 25, the high rate is not rewarded with effect worthy of the increases.

If the stretching is carried out in a particular direction, the stretching ratio in that direction is preferably from 1.05 to 10, more preferably from 1.1 to 5, even more preferably 1.2 to 3. If the stretching ratio is less than 1.05, a desired retardation may not be available. This is not desirable. If the ratio exceeds 10, the high rate may not be rewarded with effect worthy of the increases, and the film may be torn while being stretched. This is again not desirable.

The stretching rate (one direction) is preferably from 10 to 20,000%/min., more preferably from 100 to 10,000%/min. If the rate is less than 10%/min., it takes time to achieve a sufficient stretching ratio. This will add to manufacturing cost and not desirable. If the rate exceeds 20,000%/min., the stretched film may be torn, which is not desirable.

The retardation film in accordance with the present invention is obtained by stretching a film composed primarily of an acrylic polymer (hereinafter, an "unstretched film"). The retardation film is preferably stretched in two phases. The unstretched film is stretched at a temperature not lower than the glass transition temperature of the unstretched film in the first phase and then at temperature from (Glass Transition Temperature of the Film−10)° C. to (Glass Transition Temperature of the Film+20)° C. in the subsequent second phase. Besides, the stretching temperature is higher in the first phase than in the second phase by not less than 5° C.

The stretching temperature in the first phase is not limited in any particular manner so long as the stretching temperature is not lower than the glass transition temperature of the unstretched film. The stretching temperature is preferably from the glass transition temperature of the film to (Glass Transition Temperature of the Film+40)° C., more preferably from (Glass Transition Temperature of the Film+2)° C. to (Glass Transition Temperature of the Film+30)° C., even more preferably from (Glass Transition Temperature of the Film+5)° C. to (Glass Transition Temperature of the Film+25)° C.

If the stretching temperature in the first phase is below the glass transition temperature of the film, retardation develops in the first phase, and the in-plane retardation is erased by the second phase of stretching. Therefore, the ultimately obtained film tends to show a low retardation. If the stretching temperature in the first phase exceeds (Glass Transition Temperature of the Film+40)° C., the resin is likely to be flowable, making stable stretching difficult.

In the description above, the stretching temperature is in some occurrences given as a difference from the glass transition temperature of the unstretched film. For example, "(Glass Transition Temperature+40)° C." refers to a temperature that is 40° C. higher than the glass transition temperature. "(Glass Transition Temperature−10)° C." refers to a temperature that is 10° C. lower than the glass transition temperature.

The stretching ratio in the first phase is preferably from 1.1 to 25, more preferably from 1.2 to 10, even more preferably from 1.3 to 5. If the stretching ratio is below 1.1, the flexibility does not improve as much. If the stretching ratio exceeds 25, the high stretching ratio is not rewarded with as much effect. In addition, the film is more likely to be torn while being stretched.

The stretching rate in the first phase is preferably from 10 to 20,000%/min., more preferably from 100 to 10,000%/min. If the stretching rate is below 10%/min., it takes a long time to stretch the unstretched film. That adds to manufacturing cost. If the stretching rate exceeds 20,000%/min., the stretched film could be torn.

The stretching temperature in the second phase is preferably from (Glass Transition Temperature of Unstretched Film−10)° C. to the film (Glass Transition Temperature of the Film+20)° C., more preferably from (Glass Transition Temperature of the Film−10)° C. to (Glass Transition Temperature of the Film+15)° C., even more preferably from (Glass Transition Temperature of the Film−5)° C. to (Glass Transition Temperature of the Film+15)° C.

If the stretching temperature in the second phase is below (Glass Transition Temperature of the Film−10)° C., the stretching could not result in a sufficient stretching ratio. If the stretching temperature in the second phase exceeds (Glass Transition Temperature of the Film+20)° C., the polymer in the film may not orient sufficiently, possibly failing to provide a requisite retardation.

The stretching ratio in the second phase is preferably from 1.1 to 25, more preferably from 1.2 to 10, even more preferably from 1.3 to 5. If the stretching ratio is below 1.1, the flexibility does not improve as much. If the stretching ratio exceeds 25, the high stretching ratio is not rewarded with as much effect. In addition, the film is more likely to be torn while being stretched.

The stretching rate in the second phase is preferably from 10 to 20,000%/min., more preferably from 100 to 10,000%/min If the stretching rate is below 10%/min., it takes a long time to stretch the unstretched film. That adds to manufacturing cost. If the stretching rate exceeds 20,000%/min., the stretched film could be torn.

According to the stretching method, the stretching temperature in the first phase is higher than the stretching temperature in the second phase by not less than 5° C. Carried out at higher temperature than the second phase, the first phase imparts flexibility against bending/folding perpendicular to the stretching direction without inducing large retardation. The second phase, carried out subsequently at lower temperature than the first phase, further imparts flexibility parallel to a given axis, producing a retardation film with a large in-plane retardation.

Under these circumstances, if the stretching temperature in the first phase is below the stretching temperature of the second phase plus 5° C., it could become difficult to provide both flexibility along a given axis and a requisite retardation. To impart a large in-plane retardation to the film, the second phase of stretching is preferably conducted at lower temperature. By setting the stretching temperature in the first phase higher than the stretching temperature in the second phase by not less than 5° C., the film becomes unlikely to be torn in the second phase of stretching.

In this stretching method, the stretching ratio in the second phase is preferably greater than the stretching ratio in the first phase. If the stretching ratio in the first phase is not less than the stretching ratio in the second phase, it could become difficult to provide both flexibility along a given axis and a requisite retardation.

In the stretching method, the stretching direction in the second phase is preferably perpendicular to the stretching direction in the first phase. When that is the case, sufficient flexibility can be imparted against bending/folding along a given axis.

The method of manufacturing of the retardation film in accordance with the present invention may, for example, use free-width stretching, fixed-width stretching, and similar uniaxial stretching.

The retardation film in accordance with the present invention has a thickness of preferably 5 to 350 μm, more preferably 20 to 200 μm, even more preferably 30 to 150 μm. If the thickness is below 5 μm, the film does not have enough strength and rarely achieves a desired retardation (retardation value). If the thickness exceeds 350 μm, the large thickness can be an obstacle in building thin liquid crystal displays.

The thickness of the film can be measured using a commercially available measuring instrument, for example, Digimatic Micrometer (manufactured by Mitsutoyo Corporation).

The retardation film in accordance with the present invention has an in-plane retardation of preferably from 130 to 500 nm, inclusive, more preferably from 150 to 500 nm, inclusive, even more preferably from 170 to 500 nm, inclusive, still more preferably from 200 to 450 nm, inclusive, per 100 μm thickness at a wavelength of 589 nm. If the in-plane retardation is below 130 nm, the thickness of the film must be increased to obtain a desired retardation (retardation value). This is not desirable. If the thickness exceeds 500 nm, the retardation (retardation value) changes with even minute changes in stretching conditions, making stable manufacturing difficult. This is again not desirable. To obtain a large retardation, the stretching ratio needs to be increased, and the stretching temperature decreased. The film may be torn while being stretched, making stable manufacturing difficult.

The retardation film in accordance with the present invention preferably has a thickness-direction retardation in absolute value of from 70 to 400 nm, inclusive, more preferably from 90 to 350 nm, inclusive, even more preferably from 120 to 350 nm, inclusive, still more preferably from 150 to 300 nm, inclusive, per 100 μm thickness at a wavelength of 589 nm.

The retardation is also called the retardation value. The in-plane retardation (Re) in this context is defined as Re=(nx−ny)×d.

The thickness-direction retardation (Rth) is defined as Rth=[(nx+ny)/2−nz]×d.

In the equations, nx is the refractive index along the direction of the slow axis in the film plane, ny is the refractive index perpendicular to nx in the film plane, nz is the refractive index in the film thickness direction, and d is the thickness of the film in nanometers. The slow axis direction is defined as the direction in which the refractive index in the film plane is a maximum. The property exhibiting a refractive index which increases in the stretching direction is termed positive birefringence. The property exhibiting a refractive index which increases perpendicular to the stretching direction in the film plane is termed negative birefringence.

The in-plane retardation per 100 μm thickness at a wavelength of 589 nm refers to the value of the above equation defining the in-plane retardation (Re) when d=100×10³ nm. The thickness-direction retardation per 100 μm thickness at a wavelength of 589 nm refers to the value of the above equation defining the thickness-direction retardation (Rth) when d=100×10³ nm.

The in-plane retardation Re of the retardation film in accordance with the present invention at 589 nm is preferably 20 nm to 1,000 nm, more preferably 50 to 500 nm, even more preferably 100 to 350 nm.

If the retardation film in accordance with the present invention is used as a λ/2 plate, the Re at 589 nm is preferably 200 to 350 nm, more preferably 240 to 300 nm, even more preferably 260 to 280 nm, most preferably 265 to 275 nm.

If the retardation film in accordance with the present invention is used as a λ/4 plate, the Re at 589 nm is preferably 100 to 200 nm, more preferably 120 to 160 nm, even more preferably 130 to 150 nm, most preferably 135 to 145 nm.

The retardation film in accordance with the present invention has a thickness-direction retardation (Rth) in absolute value of preferably 10 nm to 500 nm, more preferably 50 to 400 nm, even more preferably 100 to 300 nm, at 589 nm.

The retardation film in accordance with the present invention may have either positive birefringence or negative birefringence. Positive birefringence is preferable because the film can be readily attached to a polarizing plate in the assembly of liquid crystal displays. Specifically, in some cases, a retardation film needs to be attached to a polarizing plate in the assembly of a liquid crystal display so that the absorption axis of the polarizing plate is perpendicular to the slow axis in the retardation film plane. The polarizing plate to which a biaxial retardation film is attached is typically wound in a roll with the absorption axis extending lengthwise. If the retardation film has positive birefringence, a slow axis occurs in the widthwise stretching direction in wide width biaxial stretching. This eliminates the need to cut the retardation film before attaching it to the polarizing plate. The "roll-to-roll" method may be used to attach the film.

For evaluation of the birefringence as to whether it is positive or negative can be determined by an additive color method using a λ/4 plate on a polarization microscope. The method is described in Ch. 5, pp. 78-82, *Introduction to Polarization Microscope for Polymer Material Analysis*, KURIYA Hiroshi, Agne Technology Center (2001). Alternatively, the retardation film, either as it is or after thermal shrinking, may be uniaxially stretched to see if the refractive index in the stretching direction increases or not.

The retardation film in accordance with the present invention has a glass transition temperature of preferably 110° C. to 200° C., more preferably 115° C. to 200° C., even more preferably 120° C. to 200° C., still more preferably 125° C. to 190° C., most preferably 130° C. to 180° C. If the glass transition temperature is below 110° C., the film does not have sufficient heat resistance in view of growingly demanding operating environment; the film may deform and be more likely to produce non-uniform retardation. This is not desirable. On the other hand, if the glass transition temperature exceeds 200° C., the resultant retardation film has ultra-high heat resistance. However, it may be difficult to mold into film, or the resultant film may have greatly reduced flexibility. This is again not desirable.

In the specification, the glass transition temperature (Tg) is measured by a midpoint method according to ASTM-D-3418.

The retardation film in accordance with the present invention has a total light transmittance of preferably not less than 85%, more preferably not less than 90%, even more preferably not less than 91%. The total light transmittance is a measure of transparency. If the total light transmittance is less than 85%, the transparency decreases so much that the resultant film is unsuited for use as an optical film.

The retardation film in accordance with the present invention has haze of preferably not more than 5%, more preferably not more than 3%, even more preferably not more than 1%. If the haze exceeds 5%, the transparency decreases so much that the resultant film is unsuited for use as an optical film.

The viewing angle dependency of the retardation film in accordance with the present invention is evaluated by Re(40°)/Re(0°), where Re(0°) is a retardation obtained when an incident beam at a wavelength of 589 nm enters the film vertical to the surface, and Re(40°) is a retardation obtained when the same beam enters the film at 40° to the normal to the film surface (specifically, the retardation obtained by measurement with the slow axis as a tilted axis being tilted by 40°). Re(40°)/Re(0°) is preferably from 0.85 to 1.20, more preferably from 0.90 to 1.15, even more preferably from 0.95 to 1.12. If Re(40°)/Re(0°) is either less than 0.85 or greater than 1.20, the viewing angle dependency becomes too large. This is not desirable.

The wavelength dispersion of the retardation film in accordance with the present invention is evaluated by the ratio R'/Re, where Re is the retardation at a wavelength of 589 nm and R' is the retardation at a wavelength of 450 nm. The ratio is preferably from 0.9 to 1-2, more preferably from 0.95 to 1.15.

The retardation film in accordance with the present invention is preferably flexible. More preferably, the film is flexible in an arbitrary set of two orthogonal in-plane directions of the film. Specifically, when folded 180° in a direction parallel to the slow axis in the film plane or in a direction perpendicular to that slow axis in the film plane with a folding radius of 1 mm in a 25° C., 65% RH (relative humidity) atmosphere, the film preferably allows no cracks to develop in either of the directions. The folding radius in this context refers to the distance from the center of bending/folding of the film to the far end of the bend. A retardation film that allows no cracks to develop when folded 180° with a folding radius of 1 mm is very easy to handle and useful in industrial applications. A film that allows cracks to develop when folded 180° with a folding radius of 1 mm in a 25° C., 65% RH atmosphere has insufficient flexibility and is difficult to handle. Bending/folding tests are conducted according to the JIS, preferably, for example, K5600-5-1 (1999). The geometry of the cracks is not limited in any particular manner. The term refers to any narrow, 1-mm or longer opening.

The retardation film in accordance with the present invention, when folded 180° in the parallel and perpendicular directions to the slow axis in the film plane with the 1-mm folding radius in the 25° C., 65% RH (relative humidity) atmosphere, preferably does not partially or entirely fracture (allows no cracks) along the bend/fold in either of the directions. Cracks which are so small that the film cannot fracture along the bend/fold are acceptable. More preferably, however, even such small cracks do not develop.

The acrylic polymer which is the primary component of the retardation film in accordance with the present invention has preferably any lactone ring structure, and more preferably a lactone ring structure of general formula (1). The acrylic polymer with a lactone ring structure is manufactured by polymerization and cyclization condensation of monomer components containing a compound (monomer) having the structure of general formula (2) and a (meth)acrylic ester (monomer) other than the compound (monomer) having a structure of general formula (2) in a ratio of preferably from 22:78 to 80:20 in wt %, more preferably from 24:76 to 50:50 in wt %, even more preferably from 27:73 to 40:60 in wt %. If the compound (monomer) having a structure of general formula (2) is less than 22 wt %, it is difficult to achieve desired retardation. If the film, in an effort to achieve desired retardation, is stretched under such conditions that desired retardation is more likely, for example, with a large stretching ratio or at low stretching temperature, the film may not be stretched, but torn. If the compound (monomer) having a structure of general formula (2) exceeds 80 wt %, gelation can occur in the polymerization reaction or the cyclization condensation, and the resultant acrylic polymer may have low moldability. In addition, the resultant film may have reduced flexibility.

The retardation film in accordance with the present invention may be used alone, but provides better control over optical properties if used in a laminate with the same kind of optical material and/or a different kind of optical material. The optical materials used in that laminate are not limited in any particular manner. Examples include a polarizing plate, a stretched/orientated polycarbonate film, and a stretched/orientated cyclic polyolefin film.

The retardation film in accordance with the present invention is preferably used as an optical compensation member in the liquid crystal display. Specific examples include a retardation film, a λ/2 plate, a λ/4 plate, a reverse wavelength dispersion film, an optical compensation film, a color filter, a film stacked on a polarizing plate, and a polarizing plate optical compensation film for use in an LCD, such as the STN LCD, the TFT-TN LCD, the OCB LCD, the VA LCD, and the IPS LCD. These are not the only applications for the retardation film in accordance with the present invention.

The embodiments and examples described in Best Mode for Carrying Out the Invention are for illustrative purposes only and by no means limit the scope of the present invention. Variations are not to be regarded as a departure from the spirit and scope of the invention, and all such modifications as would be obvious to one skilled in the art are intended to be included within the scope of the claims below.

As described so far, the present invention provides a retardation film with excellent transparency, heat resistance, and the property of retardation. If the acrylic polymer has a lactone ring structure, the present invention provides an acrylic retardation film with positive birefringence.

EXAMPLES

The following will describe the present invention more specifically by means of examples and comparative examples, which were by no means intended to be limiting the present invention. Throughout the following description, "parts by weight" and "liters" may be abbreviated "parts" and "L" respectively for convenience.

<Polymerization Reactivity, Polymer Composition Analysis>

The reactivity for the polymerization reaction and the content ratio of specific monomer units in the polymer were obtained by measuring the amount of unreacted monomer in the obtained polymerization reaction mixture by gas chromatography (GC17A manufactured by Shimazu Corporation).

<Dynamic TG>

A polymer (alternatively, polymer solution or pellets) was first dissolved or diluted in tetrahydrofuran and then introduced to excess hexane or methanol for reprecipitation. Precipitate was collected and dried in vacuum (1 mmHg (1-33 hPa), 80° C., 3 hours or longer) to remove, for example, volatile components. Obtained white solid resin was analyzed by the following method (dynamic TG).

Instrument: Thermo Plus2 TG-8120 Dynamic TG (manufactured by Rigaku Corporation)

Conditions: Weight of Each Sample=5 to 10 mg

Rising Rate of Temperature: 10° C./min.

Atmosphere: Nitrogen Flow of 200 ml/min.

Method: Stepwise Isothermal Control (Weight reduction rate was 0.005%/sec or less from 60° C. to 500° C.)

<Dealcoholization Reactivity (Lactone Cyclization Ratio)>

Dealcoholization reactivity (lactone cyclization ratio) was obtained from a weight reduction in dealcoholization reaction which occurred from 150° C. immediately before weight started to decrease to 300° C. immediately before the polymer started to decompose in dynamic TG measurement, using a weight reduction which occurred when all hydroxyl groups were removed, in the form of methanol, from the polymer composition obtained from the polymerization as a reference.

In other words, a weight reduction ratio from 150° C. to 300° C. was measured in dynamic TG measurement of the polymer with a lactone ring structure. Let X be the measured weight reduction ratio. Meanwhile, let Y be the theoretical weight reduction ratio on an assumption that all hydroxyl groups present in the polymer composition were removed in the form of alcohol (dealcoholization) from the polymer composition to contribute to the formation of lactone rings (that is, the weight reduction ratio calculated assuming a 100% dealcoholization reaction of the composition). The theoretical weight reduction ratio Y, more specifically, can be calculated from the molar ratio to the polymer of raw material monomers which have a structure contributing to dealcoholization reaction (hydroxyl groups), or in other words, from the raw material monomer content ratio in the polymer composition. These values X and Y were plugged into the dealcoholization expression:

1−(Actual Weight Reduction Ratio $X$/Theoretical Weight Reduction Ratio $Y$).

The obtained value in percentage was the dealcoholization reactivity.

As an example, the lactone ring structure content in the pellets obtained in manufacturing example 1 (detailed later) will be calculated. The theoretical weight reduction ratio Y of the polymer was (32/116)×24.3≈6.70 wt % because the molecular weight of methanol was 32, the molecular weight of methyl 2-(hydroxymethyl)acrylate was 116, and the methyl 2-(hydroxymethyl)acrylate content ratio (in weight) in the polymer prior to lactone cyclization was 24.3 wt % from the composition. Meanwhile, the measured weight reduction ratio X obtained from dynamic TG measurement was 0.20 wt %. These values were plugged into the dealcoholization expression:

$$1-(0.20/6.70) \approx 0.970.$$

Thus, the dealcoholization reactivity was 97.0%.

Supposing that the lactone cyclization reaction proceeded as far as the dealcoholization reactivity, the lactone ring content ratio could be calculated from the following expression:

$$\text{Lactone Ring Content Ratio (wt \%)} = B \times A \times M_R/M_m$$

where B was the content weight ratio of raw material monomer structural units having a structure (hydroxyl group) contributing to the lactone cyclization in the polymer prior to the lactone cyclization, $M_R$ was the formula weight of a generated lactone ring structural unit, $M_m$ was the molecular weight of raw material monomer having a structure (hydroxyl group) contributing to the lactone cyclization, and A was the dealcoholization reactivity.

For example, in manufacturing example 1, the lactone ring content ratio of the acrylic resin was 34.5 (=24.3×0.970×170/116) wt % because the methyl 2-(hydroxymethyl)acrylate content ratio in the polymer prior to lactone cyclization of acrylic resin (pellets (1A)) was 24.3 wt %, the calculated dealcoholization reactivity was 97.0%, and the formula weight of the lactone ring structural unit generated when the methyl 2-(hydroxymethyl)acrylate (molecular weight=116) condensed with methyl methacrylate was 170.

<Weight-Average Molecular Weight>

The weight-average molecular weight of the polymer was obtained by GPC (a GPC system manufactured by Tosoh Corporation, chloroform solvent) with the polystyrene as the reference.

<Thermal Analysis of Resin and Film>

The thermal analysis of the resin and the film was carried out with samples weighing about 10 mg, a rising rate of temperature of 10° C./min., and a nitrogen flow of 50 cc/min., by using a DSC ("DSC-8230" manufactured by Rigaku Corporation). Glass transition temperature (Tg) was measured by a midpoint method according to ASTM-D-3418.

The glass transition temperature was measured in a temperature range of 30 to 250° C.

<Melt Flow Rate>

Melt flow rate was measured according to JIS K6874 at a test temperature of 240° C. and under a load of 10 kg.

<Optical Properties>

The in-plane retardation and the thickness-direction retardation per 100 μm film thickness at a wavelength of 589 nm were calculated from the film in-plane retardation (Re) and the thickness-direction retardation (Rth) which were in turn measured using a KOBRA-WR manufactured by Oji Scientific Instruments.

An in-plane retardation (Re), a thickness-direction retardation (Rth), a retardation measured with the slow axis, as a tilt axis, being tilted by 400 (Re(40°)), and three-dimensional refractive indices nx, ny, nz were obtained by inputting the average refractive index of the film measured with an Abbe refractometer, a film thick d, the slow axis as a tilt center axis, and an incident angle as 40°.

Total light transmittance and haze were measured using a NDH-1001DP manufactured by Nippon Denshoku Industries Co., Ltd. The refractive index was measured, using a refractometer (Digital Abbe refractometer DR-M2 manufactured by Atago Co., Ltd.), at 23° C. at a wavelength of 589 nm in accordance with JIS K 7142.

<Film Thickness>

The thickness of the film was measured with a Digimatic Micrometer (manufactured by Mitsutoyo Corporation).

<Flexibility>

The flexibility of the film was tested in two directions: the direction in which the film was stretched and the direction perpendicular to that stretching direction. A biaxially stretched film was tested in the two orthogonal stretching directions. The film was folded 180° with a folding radius of 1 mm in a 25° C., 65% RH atmosphere. If no cracks occurred in the two directions, the film was evaluated as being good. If cracks occurred only in one of the directions, the film was evaluated as being fair. If cracks occurred in both directions, the film was evaluated as being bad.

<Folding Endurance Count>

The folding endurance count of the film was measured according to JIS P8115 under a load of 50 g using a folding endurance tester (MIT, BE-201 manufactured by Tester Sangyo Co. Ltd.). Sample films measuring 15 mm in width and 80 mm in length were placed in a 25° C., 65% RH atmosphere for 1 hour or longer before testing. Samples were bent in two directions similarly to the flexibility tests, and the number of times the samples could be bent were counted until the sample was broken into two. The test was repeated three times for each direction to obtain an average for each direction. The smaller average was taken as the folding endurance count.

Manufacturing Example 1

A 30-L reaction vessel was charged with 7,500 g of methyl methacrylate (MMA), 2,500 g of methyl 2-(hydroxymethyl) acrylate (MHMA), and 5,152 g of a solvent mixture of methylisobutyl ketone (MIBK) and methylethyl ketone (MEK) (weight ratio 4:1). The reaction vessel was equipped with a stirrer, a temperature sensor, a condenser tube, and a nitrogen intake tube. The content was heated to 100° C. while being supplied with nitrogen. When reflux flow started, 6.4 g of tertiary butyl peroxy isopropyl carbonate (Kayacarbone BIC-75, manufactured by Kayaku Akzo Co., Ltd.) was added as an initiator. At the same time, solution polymerization started, which was then allowed to proceed under reflux flow (about 95 to 110° C.) while adding dropwise a solution of 6.4 g of tertiary butyl peroxy isopropyl carbonate, 280 g of MIBK, and 70 g of MEK over 4 hours, followed by 4 hours of aging. A solvent mixture of MIBK and MEK (weight ratio 4:1) was added dropwise when necessary, starting at 2 hours into the polymerization reaction and ending at 7 hours into the polymerization reaction, to keep the polymer concentration during the polymerization reaction at 45% or lower. The polymerization reactivity was 88.5%. The polymer contained 24.3% MHMA in weight.

45 g of stearyl phosphate/distearyl phosphate mixture (manufactured by Sakai Chemical Industry Co., Ltd.; trade name "Phoslex A-18") was added to the obtained polymer solution. Cyclization condensation was carried out under reflux flow (about 80 to 100° C.) for 5 hours. Next, the polymer solution obtained in the cyclization condensation was introduced to a vent-type twin screw extruder (φ=29.75 mm; L/D=30) at a rate of 2.0 kg/hour in terms of an amount of resin. The extruder had a barrel temperature of 260° C., rotated at 100 rpm, was depressurized to 13.3 to 400 hPa (10 to 300 mmHg) and equipped with one rear vent and four fore vents. Cyclization condensation and devolatilization were carried out in the extruder. The content was extruded to obtain transparent pellets (1A).

The obtained pellets (1A) were subjected to dynamic TG measurement, and a 0.20 wt % weight reduction was detected. The pellets had a weight-average molecular weight of 201,000, a melt flow rate of 4.3 g/10 min., and a glass transition temperature of 134° C.

Manufacturing Example 2

A 30-L reaction vessel was charged with 7,000 g of MMA, 3,000 g of MHMA, and 6,667 g of a solvent mixture of MIBK and MEK (weight ratio 9:1). The reaction vessel was equipped with a stirrer, a temperature sensor, a condenser tube, and a nitrogen intake tube. The content was heated to 105° C. while being supplied with nitrogen. When reflux flow started, 6.0 g of t-amyl peroxy isononanoate (Rupasol 570, manufactured by Atofina Yoshitomi Ltd.) was added as an initiator. At the same time, solution polymerization started, which was then allowed to proceed under reflux flow (about 95 to 110° C.) while adding dropwise a solution of 12.0 g of t-amyl peroxy isononanoate and 3,315 g of a solvent mixture of MIBK and MEK (weight ratio 9:1) over 3 hours, followed by 4 hours of aging. The polymerization reactivity was 94.5%. The polymer contained 29.7% MHMA in weight.

20 g of octyl phosphate/dioctyl phosphate mixture (manufactured by Sakai Chemical Industry Co., Ltd.; trade name "Phoslex A-8") was added to the obtained polymer solution. Cyclization condensation was carried out under reflux flow (about 85 to 100° C.) for 2 hours. Cyclization condensation was further carried out, using a 240° C. thermal medium, in an autoclave under pressure (maximum gauge pressure=about 2 MPa) for 1.5 hours. Next, the polymer solution obtained in the cyclization condensation was, similarly to manufacturing example 1, subjected to cyclization condensation and devolatilization in a vent-type twin screw extruder and extruded to obtain transparent pellets (2A).

The obtained pellets (2A) were subjected to dynamic TG measurement, and a 0.25 wt % weight reduction was detected. The pellets had a weight-average molecular weight of 127,000, a melt flow rate of 6.5 g/10 min., and a glass transition temperature of 140° C. In addition, a press film was fabricated to measure its refractive index which was 1.504.

Manufacturing Example 3

Polymerization was carried out similarly to manufacturing example 2, except that 6,500 g of MMA and 3,500 g of MHMA were used as monomer and that a solution of 12.0 g of t-amyl peroxy isononanoate and 3,315 g of a solvent mixture of MIBK and MEK (weight ratio 9:1) was added dropwise over 3.5 hours. The polymerization reactivity was 95.5%. The polymer contained 34.9% MHMA in weight.

Next, the obtained polymer solution was, similarly to manufacturing example 2, subjected to cyclization condensation, except that the barrel temperature was now 265° C., then subjected to cyclization condensation and devolatilization in an extruder, and extruded to obtain transparent pellets (3A).

The obtained pellets (3A) were subjected to dynamic TG measurement, and a 0.25 wt % weight reduction was detected. The pellets has a weight-average molecular weight of 118,000, a melt flow rate of 3.6 g/10 min., and a glass transition temperature of 148° C.

Manufacturing Example 4

A 30-L reaction vessel was charged with 6,000 g of MMA, 3,000 g of MHMA, 1,000 g of methyl acrylate (MA), and 4,925 g of MIBK. The reaction vessel was equipped with a stirrer, a temperature sensor, a condenser tube, and a nitrogen intake tube. The content was heated to 105° C. while being supplied with nitrogen. When reflux flow started, 5.0 g of t-amyl peroxy isononanoate was added as an initiator. At the same time, solution polymerization started, which was then allowed to proceed under reflux flow (about 100 to 120° C.) while adding dropwise a solution of 13.0 g of t-amyl peroxy isononanoate and 5,057 g of MIBK over 3 hours, followed by 4 hours of aging. The polymerization reactivity was 97.5%. The polymer contained 30.0% MHMA in weight.

Next, the obtained polymer solution was, similarly to manufacturing example 2, subjected to cyclization condensation. The solution was then subjected to cyclization condensation and devolatilization in an extruder and extruded to obtain transparent pellets (4A).

The obtained pellets (4A) had a weight-average molecular weight of 97,000, a melt flow rate of 29.0 g/10 min., and a glass transition temperature of 126° C.

Manufacturing Example 5

A process was carried out similarly to manufacturing example 2, except that 6,000 g of MMA, 3,000 g of MHMA, and 1,000 g of n-butyl methacrylate (BMA) were used as monomer, to obtain transparent pellets (5A). When the polymerization was terminated, the polymerization reactivity was 90.5% and the polymer contained 29.7% MHMA in weight.

The obtained pellets (5A) had a weight-average molecular weight of 134,000, a melt flow rate of 14.5 g/10 min., and a glass transition temperature of 130° C.

Manufacturing Example 6

A 30-L reaction vessel was charged with 8,000 g of MMA, 2,000 g of MHMA, and 10,000 g of toluene. The reaction vessel was equipped with a stirrer, a temperature sensor, a condenser tube, and a nitrogen intake tube. The content was heated to 105° C. while being supplied with nitrogen. When reflux flow started, 10.0 g of t-amyl peroxy isononanoate was added as an initiator. At the same time, solution polymerization started, which was then allowed to proceed under reflux flow (about 105 to 110° C.) while adding dropwise a solution of 20.0 g of t-amyl peroxy isononanoate and 100 g of toluene over 2 hours, followed by 4 hours of aging. The polymerization reactivity was 96.6%. The polymer contained 20.0% MHMA in weight.

Next, the obtained polymer solution was, similarly to manufacturing example 1, subjected to cyclization condensation, except that the amount of the stearyl phosphate/distearyl phosphate mixture was changed to 10 g. The solution was then subjected to cyclization condensation and devolatilization in an extruder and extruded to obtain transparent pellets (6A).

The obtained pellets (6A) were subjected to dynamic TG measurement, and a 0.17 wt % weight reduction was detected. The pellets had a weight-average molecular weight of 148,000, a melt flow rate of 11.0 g/10 min., and a glass transition temperature of 130° C.

Manufacturing Example 7

A 30-L reaction vessel was charged with 5,000 g of methallyl alcohol and 10,000 g of toluene. The reaction vessel was equipped with a stirrer, a temperature sensor, a condenser tube, and a nitrogen intake tube. The content was heated to 65° C. while being supplied with nitrogen. 50 g of azobisisobutyronitrile was added as an initiator. At the same time, solution polymerization started, which was then allowed to proceed at internal temperatures of about from 55 to 75° C. while adding dropwise 5,000 g of MMA over 3 hours, followed by 3 hours of aging. The polymerization reactivity was 53%.

Next, the obtained polymer solution was, similarly to manufacturing example 1, subjected to cyclization condensation. The solution was then subjected to cyclization condensation and devolatilization in an extruder and extruded to obtain transparent pellets (7A). The obtained pellets (7A) had a weight-average molecular weight of 150,000, a melt flow rate of 13.0 g/10 min., and a glass transition temperature of 132° C.

Manufacturing Example 8

Manufacture of Organic Fine Particles

A polymerization container equipped with a condenser and a stirrer was charged with 710 parts of deionized water and 1.5 parts of sodium laurylsulfate for dissolution. The internal temperature was raise to 70° C. Next, a liquid mixture of 0.93 parts of sodium formaldehyde sulfoxylate (SFS), 0.001 parts of ferrous sulfate, 0.003 parts of disodium dihydrogen ethylenediaminetetraacetate (EDTA), and 20 parts of deionized water was introduced in a single batch to the polymerization container. The gas inside the polymerization container was replaced sufficiently with nitrogen gas.

Subsequently, a monomer liquid mixture (M-1) (7.10 parts of n-butyl acrylate (BA), 2.86 parts of styrene (St), 0.02 parts of 1,4-butanediol dimethacrylate (BDMA), and 0.02 parts of allyl methacrylate (AMA)) and a polymerization initiator solution (0.13 parts of t-butylhydroperoxide (PBH) and 10.0 parts of deionized water) were added in a single batch to the content of the polymerization container. Polymerization reaction was carried out for 60 min.

Subsequently, polymerization was carried out while separately adding dropwise a monomer liquid mixture (M-2) (63.90 parts of BA, 25.74 parts of St, 0.18 parts of BDMA, and 0.18 parts of AMA) and a polymerization initiator solution (0.246 parts of PBH, 20.0 parts of deionized water) continuously over 90 min. After the dropwise addition was terminated, polymerization was continued for another 60 min.

Subsequently, polymerization was carried out while separately adding dropwise a monomer liquid mixture (M-3) (30.0 parts of methyl 2-(hydroxymethyl)acrylate (MHMA) and 70.0 parts of methyl methacrylate (MMA)) and a polymerization initiator solution (0.27 parts of PBH and 20.0 parts of deionized water) continuously over 100 min. After the dropwise addition was terminated, the internal temperature was raised to 80° C., and polymerization was continued for another 120 min. Next, the content was cooled down to an internal temperature of 40° C. Thereafter, the content was filtered through a 300-mesh metal net to obtain an emulsion polymerization liquid of organic fine particles.

The obtained emulsion polymerization liquid of organic fine particles was salted out with calcium chloride, solidified, washed in water, and dried to obtain powder organic fine particles (G1; average particle diameter 86 nm).

The average particle diameter of the organic fine particles was measured with a particle size distribution measuring instrument (Submicron Particle Sizer NICOMP 380 manufactured by NICOMP).

Manufacturing Example 9

Manufacture of Organic Fine Particles

A polymerization container equipped with a condenser and a stirrer was charged with 710 parts of deionized water and 1.5 parts of sodium laurylsulfate for dissolution. The internal temperature raised to 70° C. A liquid mixture of 0.93 parts of SFS, 0.001 parts of ferrous sulfate, 0.003 parts of EDTA, and 20 parts of deionized water was introduced in a single batch to the polymerization container. The gas inside the polymerization container was replaced sufficiently with nitrogen gas.

A monomer liquid mixture (M-1) (7.10 parts of BA, 2.86 parts of St, 0.02 parts of BDMA, and 0.02 parts of AMA) and a polymerization initiator solution (0.13 parts of PBH and 10.0 parts of deionized water) were added in a single batch to the content of the polymerization container. Polymerization reaction was carried out 60 min.

Subsequently, polymerization was carried out while separately adding dropwise a monomer liquid mixture (M-2) (63.90 parts of BA, 25.20 parts of St, and 0.9 parts of AMA) and a polymerization initiator solution (0.246 parts of PBH and 20.0 parts of deionized water) continuously over 90 min. After the dropwise addition was terminated, polymerization was continued for another 60 min to obtain the substance which will provide the cores for the core/shell structure of organic fine particles.

Subsequently, polymerization was carried out while separately adding dropwise a monomer liquid mixture (M-3) (73.0 parts of St and 27.0 parts of AN) and a polymerization initiator solution (0.27 parts of PBH and 20.0 parts of deionized water) continuously over 100 min. After the dropwise addition was terminated, the internal temperature was raised to 80° C., and polymerization was continued for another 120 min. Next, the content was cooled down to an internal temperature of 40° C. Thereafter, the content was filtered through a 300-mesh metal net to obtain an emulsion polymerization liquid of the organic fine particles.

The obtained emulsion polymerization liquid of organic fine particles was salted out with calcium chloride, solidified, washed in water, and dried to obtain powder organic fine particles (G2; average particle diameter 0.105 μm).

Manufacturing Example 10

A 30-L reaction vessel was charged with 9,000 g of MMA, 1,000 g of MA, 10,000 g of toluene, and 10 g of n-dodecyl mercaptan. The reaction vessel was equipped with a stirrer, a temperature sensor, a condenser tube, and a nitrogen intake tube. The content was heated to 105° C. while being supplied with nitrogen. When reflux flow started, 15.0 g of t-amyl peroxy isononanoate was added as an initiator. At the same time, solution polymerization started, which was then allowed to proceed under reflux flow (about 100 to 110° C.) while adding dropwise a mixed solution of 20.0 g of t-amyl peroxy isononanoate and 200 g of toluene over 2 hours, followed by 4 hours of aging. The obtained polymer solution was subjected, under similar conditions to those for manufacturing example 1, to devolatilization in a vent-type twin screw extruder, except that the barrel temperature was now 220° C., The content was then extruded to obtain transparent pellets (M). The obtained pellets (M) had a weight-average molecular weight of 150,000 and a glass transition temperature of 103° C.

Manufacturing Example 11

A 30-L reaction vessel was charged with 6,000 g of methyl methacrylate (MMA), 2,000 g of methyl 2-(hydroxymethyl)

acrylate (MHMA), 2,000 g of benzyl methacrylate (BzMA), and 10,000 g of toluene. The reaction vessel was equipped with a stirrer, a temperature sensor, a condenser tube, and a nitrogen intake tube. Next, the content of the reaction vessel was heated to 105° C. in a nitrogen flow. After reflux flow started, 10.0 g of t-amyl peroxy isononanoate (trade name "Rupasol 570" manufactured by Atofina Yoshitomi Ltd.) was added as an initiator. At the same time, solution polymerization started, which was then allowed to proceed under reflux flow (about 105 to 110° C.) while adding dropwise an initiator solution of 20.0 g of t-amyl peroxy isononanoate and 100 g of toluene over 2 hours. The toluene solution of t-amyl peroxy isononanoate was added dropwise, followed by 4 hours of aging.

The obtained polymer had a reactivity of 95.7%. The polymer contained 19.8 wt % MHMA structural units and 20.2% BzMA structural units.

10 g of an octyl phosphate/dioctyl phosphate mixture (manufactured by Sakai Chemical Industry Co., Ltd.; trade name "Phoslex A-8") was added to the obtained polymer solution. Cyclization condensation was carried out under reflux flow (about 80 to 105° C.) for 2 hours. Cyclization condensation was further carried out, using a 240° C. thermal medium, in an autoclave under pressure (maximum gauge pressure less than about 1.6 MPa) at 240° C. for 1.5 hours.

The polymer solution obtained in the cyclization condensation was introduced to a vent-type twin screw extruder (φ=29.75 mm; L/D=30) at a rate of 2.0 kg/hour in terms of an amount of resin. The extruder had a barrel temperature of 250° C., rotated at 100 rpm, was depressurized to 13.3 to 400 hPa (10 to 300 mmHg), and equipped with one rear vent and four fore vents. Cyclization condensation and devolatilization were carried out in the extruder. The content was extruded to obtain transparent pellets (11A).

The obtained pellets (11A) subjected to dynamic TG measurement, and a 0.20 wt % weight reduction was detected.

The pellets (11A) had a weight-average molecular weight of 115,000, a melt flow rate (MFR) of 49.5 g/10 min., and a glass transition temperature (Tg) of 124° C. The pellets (11A) contained 21.7 wt % BzMA structural units (measured with a $^1$H-NMR ("FT-NMR UNITY plus400," 400 MHz, manufactured by Varian Inc.; solvent, deuterated chloroform; internal standard, mesitylene).

Manufacturing Example 12

The same procedures were implemented as in manufacturing example 11 to obtain transparent pellets (12A), except that the amount of the initiator (t-amyl peroxy isononanoate) was changed to 60% that for manufacturing example 11 (that is, the amount of the t-amyl peroxy isononanoate introduced after the reflux flow started was 6.0 g, and the amount of the amyl peroxy isononanoate in the toluene solution of t-amyl peroxy isononanoate added dropwise was 12.0 g) and also that the amounts of the MMA, RHMA, and BzMA used were changed as shown in Table 1). Results of the polymerization are shown in Table 1. Results of analysis of the pellets (12A) are shown in Table 2.

Manufacturing Example 13 to 15

The same procedures were implemented as in manufacturing example 11 to obtain transparent pellets (13A) to (15A), except that the amount of the initiator (t-amyl peroxy isononanoate) was changed to 60% that for manufacturing example 11 (that is, the amount of the t-amyl peroxy isononanoate introduced after the reflux flow was started was 6.0 g, and the amount of the amyl peroxy isononanoate in the toluene solution of t-amyl peroxy isononanoate added dropwise was 12.0 g), that the duration of the dropwise addition of the initiator solution was changed to 6 hours, that the aging period was changed to 2 hours, and that the amounts of the MMA, RHMA, and BzMA used were changed as shown in Table 1), Results of the polymerization are shown in Table 1. Results of analysis of the pellets (13A) to (15A) are shown in Table 2. In addition, a press film was fabricated from the pellets (15A) to measure its refractive index which was 1.517.

Manufacturing Example 16

The same procedures were implemented as in manufacturing example 11 to obtain transparent pellets (16A), except that the amounts of the MMA, RHMA, and BzMA used were changed to as shown in Table 1. Results of the polymerization are shown in Table 1. Results of analysis of the obtained pellets (16A) are shown in Table 2.

TABLE 1

| | Initial Monomer Content (g) | | | Result of Polymerization | | | |
| | | | | Polymerization Ratio (%) | Monomer Structural Unit Content upon End of Polymerization (wt %) | | |
| | MMA | RHMA | BzMA | | MMA | RHMA | BzMA |
|---|---|---|---|---|---|---|---|
| ME. 11 | 6,000 | 2,000 | 2,000 | 95.7 | 60.0 | 19.8 | 20.2 |
| ME. 12 | 4,000 | 2,000 | 4,000 | 94.4 | 39.9 | 19.7 | 40.4 |
| ME. 13 | 5,500 | 2,500 | 2,000 | 96.9 | 54.9 | 25.0 | 20.1 |
| ME. 14 | 6,000 | 3,000 | 1,000 | 96.4 | 59.9 | 30.0 | 10.1 |
| ME. 15 | 5,000 | 3,000 | 2,000 | 96.4 | 49.8 | 30.1 | 20.1 |
| ME. 16 | 7,800 | 2,000 | 200 | 96.5 | 78.0 | 19.9 | 2.1 |

ME.: Manufacturing Example

TABLE 2

| Pellets | | Mw | MFR (g/10 min.) | Tg (° C.) | BzMA Structural Unit Content (wt %) |
|---|---|---|---|---|---|
| ME. 11 | 11A | 115,000 | 49.5 | 124 | 21.7 |
| ME. 12 | 12A | 141,000 | 87.8 | 116 | 40.7 |
| ME. 13 | 13A | 154,000 | 11.0 | 130 | 21.3 |
| ME. 14 | 14A | 146,000 | 12.5 | 137 | 11.2 |
| ME. 15 | 15A | 130,000 | 18.2 | 135 | 20.5 |
| ME. 16 | 16A | 150,000 | 11.2 | 129 | 2.2 |

ME.: Manufacturing Example

Manufacturing Example 17

Manufacture of Elastic Organic Fine Particles (G3)

A polymerization container equipped with a condenser and a stirrer was charged with 120 parts of deionized water, 50 parts of butadiene rubber polymer latex (average particle diameter 240 nm) as a solid component, 1.5 parts of oleic acid potassium, and 0.6 parts of sodium formaldehyde sulfoxylate (SFS). The gas inside the polymerization container was replaced sufficiently with nitrogen gas.

Subsequently, the internal temperature was raised to 70° C. After that, polymerization was carried out while separately adding dropwise a mixed monomer solution of 36.5 parts of styrene and 13.5 parts of acrylonitrile and a polymerization initiator solution of 0.27 parts of cumene hydroxy peroxide and 20.0 parts of deionized water continuously over 2 hours. After the dropwise addition was terminated, the internal temperature was raised to 80° C., and polymerization was continued for another 2 hours. Next, the content was cooled down to an internal temperature of 40° C. Thereafter, the content was filtered through a 300-mesh metal net to obtain an emulsion polymerization liquid of elastic organic fine particles.

The obtained emulsion polymerization liquid of elastic organic fine particles was salted out with calcium chloride, solidified, washed in water, and dried to obtain powder elastic organic fine particles (G3; average particle diameter 0.260 μm, refractive index of soft polymer layer 1.516).

The average particle diameter of the elastic organic fine particles was measured with a particle size distribution measuring instrument (Submicron Particle Sizer NICOMP 380 manufactured by NICOMP).

The butadiene rubber polymer latex (average particle diameter 240 nm) was manufactured as follows. A pressure-resistant reaction container was charged with a reaction mixture of 70 parts of deionized water, 0.5 parts of sodium pyrophosphate, 0.2 parts of oleic acid potassium, 0.005 parts of ferrous sulfate, 0.2 parts of dextrose, 0.1 parts of p-menthane-hydroperoxide, and 28 parts of 1,3-butadiene. The reaction mixture was heated to 65° C., and polymerization was carried out for 2 hours. Next, 0.2 parts of p-hydroperoxide was added to the reaction mixture, and 72 parts of 1,3-butadiene, 1.33 parts of oleic acid potassium, and 75 parts of deionized water were added dropwise continuously over 2 hours. The butadiene rubber polymer latex was obtained 21 hours into the polymerization.

Manufacturing Example 18

Manufacture of Pellets (18A) of Elastic Organic Fine Particle Kneaded Resin

The pellets (2A) obtained in manufacturing example 2 and the elastic organic fine particles (G3) obtained in manufacturing example 17 were fed by a feeder to achieve a weight ratio (2A)/(G3)=80/20 and at the same time kneaded at 280° C. by a twin screw extruder with a cylinder diameter of 20 mm to obtain pellets (18A).

Manufacturing Example 19, 20

Manufacture of Pellets (19A), (20A) of Elastic Organic Fine Particle Kneaded Resin The same procedures were implemented as in manufacturing example 18 to obtain pellets (19A), (20A), except that the type of pellets, the type of elastic organic fine particles, and the weight ratio for the kneading were changed as shown in Table 3.

TABLE 3

| | Composition (wt %) | | | |
|---|---|---|---|---|
| | Pellets | Pellets (2A) | Pellets (15A) | Elastic Organic Fine Particles (G3) |
| ME. 18 | 18A | 80 | | 20 |
| ME. 19 | 19A | 70 | | 30 |
| ME. 20 | 20A | | 70 | 30 |

ME.: Manufacturing Example

Manufacturing Example 21

A 30-L reaction vessel was charged with 7,000 g of MMA, 3,000 g of MHMA, and 12,000 g of toluene. The reaction vessel was equipped with a stirrer, a temperature sensor, a condenser tube, and a nitrogen intake tube. The content was heated to 105° C. while being supplied with nitrogen. When reflux flow started, 6.0 g of t-amyl peroxy isononanoate (Rupasol 570, manufactured by Atofina Yoshitomi Ltd.) was added as an initiator. At the same time, solution polymerization started, which was then allowed to proceed under reflux flow (about 105 to 110° C.) while adding dropwise a solution of 12.0 g of t-amyl peroxy isononanoate and 100 g of toluene over 2 hours, followed by 4 hours of aging. The polymerization reactivity was 92.9%. The polymer contained 30.2% MHMA in weight.

20 g of an octyl phosphate/dioctyl phosphate mixture (manufactured by Sakai Chemical Industry Co., Ltd.; trade name "Phoslex A-8") was added to the obtained polymer solution. Cyclization condensation was carried out under reflux flow (about 80 to 105° C.) for 2 hours. 4,000 g of methylethyl ketone was added to dilute. Cyclization condensation was further carried out, using a 240° C. thermal medium, in an autoclave under pressure (maximum gauge pressure=about 2 MPa) for 1.5 hours.

Next, the same procedures were implemented as in manufacturing example 1 to carry out cyclization condensation and devolatilization in a vent-type twin screw extruder and extrude the content to obtain transparent pellets (21A), except that the polymer solution obtained in the cyclization condensation was diluted with methylethyl ketone, that a solution of 26.5 g of zinc octanoate (18% Nikka Octhix Zinc manufactured by Nihon Kagaku Sangyo Co., Ltd.), 2.2 g of IRGA-NOX 1010 (Chiba Speciality Chemicals) as an oxidation inhibitor, 2.2 g of ADEKA STAB AO-412S (manufactured by Asahi Denka Kogyo K.K.), and 61.6 g of toluene was introduced at a rate of 20 g/hour, and that the barrel temperature was changed to 250° C.

The obtained pellets (21A) was subjected to dynamic TG measurement, and a 0.21 wt % weight reduction was detected. The pellets had a weight-average molecular weight of 110,000, a melt flow rate of 8.7 g/10 min., and a glass transition temperature of 142° C.

Subsequently, the pellets (21A) were extruded and molded into an unstretched film (21AF) with a thickness of about 400 μm, using a single screw extruder with a cylinder diameter of 20 mm under the following conditions:

Cylinder Temperature: 280° C.

Die: Coat Hanger Type, Width=150 mm, Temperature=290° C.

Casting: Glossy Two Rolls, Both First and Second Rolls at 130° C.

The unstretched film (21AF) is rolled. The width direction of the roll of unstretched film (21AF) is termed the TD direction, and the perpendicular direction to the TD direction is termed the MD direction.

A sample was cut out from the obtained unstretched film (21AF) for measurement of its retardation. The in-plane retardation was 1.3 nm (0.3 nm per 100 μm). The thickness-direction retardation was 2.2 nm (0.5 nm per 100 μm). The thickness of the sample film used in the measurement was 433 μm. The flexibility of the sample was evaluated as bad. The unstretched film (21AF) had a glass transition temperature of 142° C.

Example 1

The pellets (1A) obtained in manufacturing example 1 were melted and extruded from a 150-mm wide, coat-hanger-type T die by a twin screw extruder equipped with a 20 mm φ screw to fabricate a film with a thickness of about 140 μm. The film was uniaxially stretched 2.0 times at 139° C. and a rate of 400%/min. in an autograph (AGS-100D manufactured by Shimazu Corporation), to obtain a stretched film (1B) with a thickness of 95 μm. Table 4 shows results of various measurements on the obtained stretched film (1B) and its retardation prior to the stretching.

Examples 2 to 5 and Comparative Examples 1 to 2

Stretched films (2B to 7B) were obtained under the same conditions as in example 1, except that the stretching temperature for the pellets (2A to 7A) obtained in manufacturing examples 2 to 7 was changed respectively to 144° C., 155° C., 128° C., 133° C., 135° C. and 137° C. Table 4 shows results of various measurements on the obtained stretched films (2B to 7B). The stretched films (2B to 7B) were retardation films with positive birefringence. The folding endurance count for the stretched film (2B) was 1.

The film obtained by melting and extruding the pellets (2A) obtained in manufacturing example 2 (here, the film (2B) before being stretched) is the film (2AF).

Example 6

The pellets (2A) obtained in manufacturing example 2 and the organic fine particles (G1) obtained in manufacturing example 6 were kneaded in a twin screw extruder with a 20-mm cylinder diameter at 280° C. by continuously feeding the pellets (2A) and the particles (G1) from a feeder so as to achieve a weight ratio of 2A/G1=80/20 and filtered through leaf disc type polymer filters (available from Nagase & Company, Ltd.; filter precision=5 μm), to obtain pellets.

The resultant pellets were further melted and extruded from a 150-mm wide, coat-hanger-type T die by a single screw extruder at 270° C. to fabricate a film with a thickness of about 140 μm. The film was uniaxially stretched 2.0 times at 141° C. and a rate of 400%/min. to obtain a stretched film (2BG) with a thickness of 100 μm. Table 4 shows results of various measurements on the obtained stretched film (2BG). The result of flexibility measurement was "good" for the film 2BG and "fair" for the other films (1B to 6B, 7B).

Comparative Example 3

A stretched film (MB) was obtained under the same conditions as in example 1, except that the stretching temperature for the pellets (M) obtained in manufacturing example 10 was changed to 108° C. Table 4 shows results of various measurements on the obtained stretched film (MB) and its retardation prior to the stretching. The stretched film (MB) was a retardation film with negative birefringence.

Example 7

A stretched film (2B-1) was obtained by stretching the melted and extruded film (2AF) obtained in example 2 in the same manner as in example 1 except that the stretching temperature was changed to 142° C. and also that the stretching rate was increased from 400%/min. by 2.5 fold. Table 4 shows results of various measurements on the obtained stretched film (2B-1). The stretched film (2B-1) was a retardation film with positive birefringence. The stretched film (2B-1) had the following three-dimensional refractive indices: nx=1.50691, ny=1.50253, and nz=1.50226. Re(40°)/Re(0°)=1.118. The ratio of the in-plane retardation R' at a wavelength of 450 nm to the retardation Re at a wavelength of 589 nm: R'/Re=1.03. The folding endurance count for the stretched film (2B-1) was 1. The result of flexibility measurement was "fair."

Example 8

The melted and extruded film (2AF) obtained in example 2 were uniaxially stretched 1.2 times at a stretching temperature of 144° C. and a rate of 400%/min. in an autograph (AGS-100D manufactured by Shimazu Corporation). The film was also stretched 2.5 times at a stretching temperature of 144° C. and a rate of 400%/min. in a direction perpendicular to the previous stretching direction to obtain a sequential biaxial stretched film (8B). Table 4 shows results of various measurements on the obtained stretched film (8B). The stretched film (8B) had the following three-dimensional refractive indices: nx=1.50534, ny=1.50336, and nz=1.50300. The result of flexibility measurement was "fair."

Example 9

The same procedures were implemented as in example 8 to obtain a sequential biaxial stretched film (9B), except that the initial stretching ratio was changed to 1.5, and that the subsequent stretching ratio was changed to 2.0. Table 4 shows results of various measurements on the obtained stretched film (9B). The stretched film (9B) had the following three-dimensional refractive indices: nx=1.50507, ny=1.50367, and nz=1.50296. The result of flexibility measurement was "fair."

Example 10

The same procedures were implemented as in example 8 to obtain a sequential biaxial stretched film (10B), except that the initial stretching ratio was changed to 2.5 and that the subsequent stretching ratio was changed to 1.5 Table 4 shows results of various measurements on the obtained stretched film (10B). The stretched film (10B) had the following three-dimensional refractive indices: nx=1.50455, ny=1.50406, and nz=1.50309. The result of flexibility measurement was "fair."

Example 11

The melted and extruded film (2AF) obtained in example 2 was subjected to simultaneous biaxial stretching 1.5 times in both the end-to-end and side-to-side directions at a stretching temperature of 160° C. and a rate of 65%/min. using a biaxial stretching tester (TYPE EX4 manufactured by Toyo Seiki Seisaku-sho Ltd.), to obtain a biaxial stretched film (11B). Table 4 shows results of various measurements on the obtained stretched film (11B). The result of flexibility measurement was "good."

Example 12

The same procedures were implemented as in example 6 to obtain a stretched film (2BG2), except that the organic fine particles (G2) obtained in manufacturing example 9 were used in place of the organic fine particles (G1), that the stretching temperature was changed to 139° C., and that the stretching ratio was changed to 2.5. Table 4 shows results of various measurements on the obtained stretched film (2BG2). The result of flexibility measurement was "good."

Example 15

The same procedures were implemented as in example 13 to obtain a stretched film (15B), except that the pellets (13A) obtained in manufacturing example 13 were used in place of the pellets (11A), that the stretching temperature was changed to 133° C., and the stretching ratio was changed to 1.75. Table 5 shows results of various measurements on the obtained stretched film (15B). The obtained stretched film (15B) was a retardation film with positive birefringence.

Example 16

The same procedures were implemented as in example 13 to obtain a stretched film (16B), except that the pellets (13A) obtained in manufacturing example 13 were used in place of the pellets (11A), that the stretching temperature was changed

TABLE 4

|  | Film | Thickness of Stretched Film (μm) | Total Light Transmittance (%) | Haze (%) | In-plane Retardation per 100 μm (nm) | Thickness-Direction Retardation per 100 μm (nm) | Tg (° C.) | In-plane Retardation Before Stretching per 100 μm (nm) |
|---|---|---|---|---|---|---|---|---|
| Ex. 1 | 1B | 95 | 92 | 0.3 | 171 | 92 | 134 | 4 |
| Ex. 2 | 2B | 99 | 92 | 0.3 | 246 | 148 | 140 | 5 |
| Ex. 3 | 3B | 93 | 92 | 0.4 | 176 | 87 | 148 | 8 |
| Ex. 4 | 4B | 94 | 92 | 0.3 | 317 | 185 | 126 | 4 |
| Ex. 5 | 5B | 98 | 92 | 0.3 | 227 | 126 | 130 | 4 |
| Ex. 6 | 2BG | 100 | 91 | 0.9 | 200 | 102 | 137 | 3 |
| Ex. 7 | 2B-1 | 71 | 92 | 0.3 | 438 | 245 | 140 | 5 |
| Ex. 8 | 8B | 88 | 92 | 0.3 | 198 | 135 | 140 | 5 |
| Ex. 9 | 9B | 79 | 92 | 0.3 | 140 | 141 | 140 | 5 |
| Ex. 10 | 10B | 79 | 92 | 0.3 | 49 | 122 | 140 | 5 |
| Ex. 11 | 11B | 50 | 93 | 0.3 | 57 | 100 | 140 | 5 |
| Ex. 12 | 2BG2 | 100 | 91 | 0.7 | 175 | 89 | 135 | 3 |
| Comp. Ex. 1 | 6B | 100 | 92 | 0.3 | 102 | 52 | 130 | 3 |
| Comp. Ex. 2 | 7B | 98 | 92 | 0.3 | 90 | 46 | 132 | 3 |
| Comp. Ex. 3 | MB | 101 | 93 | 0.2 | 40 | −23 | 103 | 1 |

Ex.: Exampple
Comp. Ex.: Comparative Example

Example 13

The pellets (11A) obtained in manufacturing example 11 were melted and extruded from a 150-mm wide, coat-hanger-type T die by a twin screw extruder equipped with a 20 mm φ screw to fabricate a film with a thickness of about 140 μm. The film was uniaxially stretched 2.0 times at 127° C. and a rate of 400%/min. in an autograph (product name: AGS-100D, manufactured by Shimazu Corporation) to obtain a stretched film (13B) with a thickness of 100 μm. Table 5 shows results of various measurements on the obtained stretched film (13B). The obtained stretched film (13B) was a retardation film with positive birefringence.

Example 14

The same procedures were implemented as in example 13 to obtain a stretched film (14B), except that the pellets (12A) obtained in manufacturing example 12 were used in place of the pellets (11A) and that the stretching temperature was changed to 120° C. Table 5 shows results of various measurements on the obtained stretched film (14B). The obtained stretched film (14B) was a retardation film with positive birefringence.

to 133° C., and the stretching ratio was changed to 2.2. Table 5 shows results of various measurements on the obtained stretched film (16B). The obtained stretched film (16B) was a retardation film with positive birefringence.

Example 17

The same procedures were implemented as in example 13 to obtain a stretched film (17B), except that the pellets (14A) obtained in manufacturing example 14 were used in place of the pellets (11A) and that the stretching temperature was changed to 143° C. Table 5 shows results of various measurements on the obtained stretched film (17B). The obtained stretched film (17B) was a retardation film with positive birefringence.

Example 18

The same procedures were implemented as in example 13 to obtain a stretched film (18B), except that the pellets (15A) obtained in manufacturing example 15 were used in place of the pellets (11A) and that the stretching temperature was changed to 137° C. Table 5 shows results of various measurements on the obtained stretched film (18B). The obtained stretched film (18B) was a retardation film with positive birefringence.

Comparative Example 4

The same procedures were implemented as in example 13 to obtain a stretched film (C4B), except that the pellets (16A) obtained in manufacturing example 16 were used in place of the pellets (11A) and that the stretching temperature was changed to 132° C. Table 5 shows results of various measurements on the obtained stretched film (C4B). The obtained stretched film (C4B) was a retardation film with positive birefringence.

Examples 21, 22

The same procedures were implemented as in example 19 to obtain a stretched films (21B), (22B), except that the pellets (19A) obtained in manufacturing example 19 were used in place of the pellets (18A), that the stretching ratio was changed to 2.0 for example 21 and 2.5 for example 22 respectively. Table 6 shows results of various measurements on the obtained stretched film. The obtained stretched films were retardation films with positive birefringence.

Examples 23, 24

The same procedures were implemented as in example 19 to obtain a stretched films (23B), (24B), except that the pellets

TABLE 5

|  | Film | Pre-stretching In-plane Retardation per 100 μm (nm) | Thickness (μm) | Post-stretching | | | | | |
|---|---|---|---|---|---|---|---|---|---|
|  |  |  |  | In-plane Retardation Value (nm) | In-plane Retardation per 100 μm (nm) | Thickness-Direction Retardation per 100 μm (nm) | Total Light Transmittance (%) | Haze (%) | Tg (° C.) |
| Ex. 13 | 13B | 3 | 100 | 197 | 197 | 101 | 92 | 0.3 | 124 |
| Ex. 14 | 14B | 3 | 105 | 268 | 256 | 144 | 92 | 0.3 | 116 |
| Ex. 15 | 15B | 4 | 104 | 182 | 175 | 86 | 92 | 0.3 | 130 |
| Ex. 16 | 16B | 4 | 95 | 210 | 221 | 97 | 92 | 0.3 | 130 |
| Ex. 17 | 17B | 5 | 99 | 297 | 300 | 153 | 92 | 0.3 | 137 |
| Ex. 18 | 18B | 3 | 99 | 373 | 378 | 196 | 92 | 0.4 | 135 |
| Comp. Ex. 4 | C4B | 3 | 100 | 111 | 111 | 57 | 92 | 0.3 | 129 |

Ex.: Exampple
Comp. Ex.: Comparative Example

Example 19

The pellets (18A) obtained in manufacturing example 18 were melted and extruded from a 150-mm wide, coat-hanger-type T die by a twin screw extruder equipped with a 20 mm φ screw to fabricate a film with a thickness of about 140 μm. The film was uniaxially stretched 2.0 times at 141° C. and a rate of 400%/min. in an autograph (AGS-100D, manufactured by Shimazu Corporation), obtain a stretched film (19B) with a thickness of 100 μm. Table 6 shows results of various measurements on the obtained stretched film (19B) and its retardation prior to the stretching. The stretched film (19B) was a retardation film with positive birefringence.

Example 20

The same procedures were implemented as in example 19 to obtain a stretched film (20B), except that the stretching ratio was changed to 2.5. Table 6 shows results of various measurements on the obtained stretched film (20B). The stretched film (20B) was a retardation film with positive birefringence.

(20A) obtained in manufacturing example 20 were used in place of the pellets (18A), that the stretching temperature was changed to 136° C., and that the stretching ratio was changed to 2.0 for example 23 and 2.5 for example 24 respectively. Table 6 shows results of various measurements on the obtained stretched film. The obtained stretched films were retardation films with positive birefringence.

In examples 21, 22, the refractive index of the pellets (2A) differs from the refractive index of the soft polymer layers (here, polybutadiene cores) of elastic organic fine particles by 0.012. On the other hand, in examples 23, 24, the refractive index of the pellets (15A) differs from the refractive index (0.001) of the soft polymer layers (here, polybutadiene cores) of elastic organic fine particles by not more than 0.01. Therefore, the obtained retardation film has better transparency (smaller haze value). The refractive index difference between the acrylic polymer and the soft polymer layers of the elastic organic fine particles is preferably not more than 0.005, more preferably not more than 0.002.

TABLE 6

|  | Film | Pellets | Pre-stretching *1 | Post-stretching | | | | | | | | | |
|---|---|---|---|---|---|---|---|---|---|---|---|---|---|
|  |  |  |  | *2 (nm) | *3 (μm) | *4 | *1 | *5 | Total Light Transmittance (%) | Haze (%) | Low-end Tg (° C.) | Tg (° C.) | Folding Endurance Count (times) |
| Ex. 19 | 19B | 18A | 4 | 236 | 100 | 2.0 | 236 | 117 | 91 | 1.0 | −88 | 139 | 17 |
| Ex. 20 | 20B | 18A | 4 | 319 | 90 | 2.5 | 354 | 184 | 91 | 1.0 | −87 | 139 | 3 |

TABLE 6-continued

| | | | Post-stretching | | | | | | | | |
|---|---|---|---|---|---|---|---|---|---|---|---|
| Film | Pellets | Pre-stretching *1 | *2 (nm) | *3 (μm) | *4 | *1 | *5 | Total Light Transmittance (%) | Haze (%) | Low-end Tg (° C.) | Tg (° C.) | Folding Endurance Count (times) |
| Ex. 21 21B | 19A | 3 | 222 | 102 | 2.0 | 218 | 108 | 90 | 1.9 | −88 | 137 | 32 |
| Ex. 22 22B | 19A | 3 | 288 | 91 | 2.5 | 317 | 175 | 90 | 1.9 | −89 | 137 | 15 |
| Ex. 23 23B | 20A | 3 | 302 | 100 | 2.0 | 302 | 171 | 92 | 0.6 | −89 | 134 | 31 |
| Ex. 24 24B | 20A | 3 | 419 | 88 | 2.5 | 476 | 246 | 92 | 0.6 | −89 | 134 | 12 |

*1: In-plane Retardation per 100 μm (nm)
*2: In-plane Retardation
*3: Thickness
*4: Stretching ratio (times)
*5: Thickness-Direction Retardation per 100 μm (nm)
Ex.: Example Table 6 shows, as a low-end glass transition temperature (Tg), the lowest one of the glass transition temperatures which were observed when the obtained stretched film was heated from −150° C. using a DSC. The low-end glass transition temperature indicates the glass transition temperature of the soft polymer layers (here, polybutadiene cores) of the elastic organic fine particles present in the retardation film.

Example 25

The unstretched film (21AF) obtained in manufacturing example 21 was stretched by a corner stretch type biaxial stretching test device X6-S (manufactured by Toyo Seiki Seisaku-sho Ltd.).
Specifically, first, a square sample, 127 mm long on each side, was cut out from the unstretched film (21AF). The sample was set in a chuck of a stretcher so that the sample would be stretched in the MD direction. The internal distance for the chuck, in both the end-to-end and side-to-side directions, was specified to 110 mm. After being pre-heated at 165° C. for 3 min., the sample was subjected to a first phase of uniaxial stretching to achieve a stretching ratio of 2.6 in 10 sec. The first phase was carried out so that the sample did not shrink in the width direction (perpendicular to the stretching direction). After the stretching is complete, the sample was removed quickly and cooled. Subsequently, another square sample, 97 mm long on each side, was cut out from the obtained uniaxial stretched sample for a second phase of stretching in which the obtained uniaxial stretched sample was stretched in a perpendicular direction to the stretching direction in the first phase. The internal distance for the chuck, in both the end-to-end and side-to-side directions, was specified to 80 mm. After being pre-heated at 148° C. for 3 min., the sample was subjected to the second phase of uniaxial stretching to achieve a stretching ratio of 2.8 in 1 min. The second phase was carried out so that the sample did not shrink in the width direction similarly to the first phase.
Another sample was cut out from the obtained biaxial stretched film and subjected to retardation measurement. The in-plane retardation was 146 nm (262 nm per 100 μm), and the thickness-direction retardation was 134 nm (240 nm per 100 μm). The film was 56 μm thick. The flexibility of the film was evaluated as "good." The obtained biaxial stretched film had a total light transmittance of 93%, haze of 0.2%, and a glass transition temperature of 142° C.

Example 26

The same procedures were implemented to carry out a first phase of uniaxial stretching on the unstretched film (21AF) obtained in manufacturing example 21 as in the first phase of uniaxial stretching of example 25, except that the temperature was changed to 175° C. and that the rate and ratio was changed to 2.6 in 10 sec. Furthermore, the same procedures were implemented to carry out a second phase of uniaxial stretching as in the second phase of uniaxial stretching of example 25, except that the temperature was changed to 148° C. and that the rate and ratio was changed to 2.5 in 1 min. Table 8 shows results of measurement on the obtained sequential biaxial stretched film.

Example 27

The same procedures were implemented to carry out a first phase of uniaxial stretching on the unstretched film (21AF) obtained in manufacturing example 21 as in the first phase of uniaxial stretching of example 25, except that the temperature was changed to 165° C. and that the rate and ratio was changed to 3.0 in 10 sec. Furthermore, the same procedures were implemented to carry out a second phase of uniaxial stretching as in the second phase of uniaxial stretching of example 25, except that the temperature was changed to 145° C. and that the rate and ratio was changed to 2.2 in 1 min. Table 8 shows results of measurement on the obtained sequential biaxial stretched film.

Example 28

The same procedures were implemented to carry out a first phase of uniaxial stretching on the unstretched film (21AF) obtained in manufacturing example 21 as in the first phase of uniaxial stretching of example 25, except that the temperature was changed to 150° C. and that the rate and ratio was changed to 2.5 in 1 min. Furthermore, the same procedures were implemented to carry out a second phase of uniaxial stretching as in the second phase of uniaxial stretching of example 25, except that the temperature was changed to 150° C. and that the rate and ratio was changed to 2.5 in 1 min. Table 8 shows results of measurement on the obtained sequential biaxial stretched film.

Example 29

A rectangular sample, 97 mm long in the MD direction and 80 mm long in the TD direction, was cut out from the unstretched film (21AF) obtained in manufacturing example 21. The sample was set in a stretcher so that the sample would be stretched in the MD direction. The film was not held by a chuck so that the sample could shrink freely in the TD direction. The internal distance for the chuck, in both the end-to-end and side-to-side directions, was specified to 80 mm. After being pre-heated at 148° C. for 3 min., the sample was subjected to free-width uniaxial stretching to achieve a stretching ratio of 2.5 in 1 min. After the stretching is complete, the sample was removed quickly and cooled. Table 8 shows results of measurement on the obtained uniaxial stretched film.

Example 30

A square sample, 97 mm long on each side, was cut out from the unstretched film (21AF) obtained in manufacturing example 21. The sample was set in a chuck of a stretcher. The internal distance for the chuck, in both the end-to-end and side-to-side directions, was specified to 80 mm. After being pre-heated at 155° C. for 3 min., the sample was subjected to simultaneous biaxial stretching to achieve a stretching ratio of 2.5 in 1 min. in both the end-to-end and side-to-side directions (MD and TD directions). After the stretching is complete, the sample was removed quickly and cooled. Table 8 shows results of measurement on the obtained simultaneous biaxial stretched film.

TABLE 7

| | | Stretching Conditions | | | |
| | | First Phase | | Second Phase | |
| | Un-stretched Film | Stretching Method | Temperature (° C.) | Ratio | Temperature (° C.) | Ratio |
|---|---|---|---|---|---|---|
| Ex. 25 | 21AF | Sequential Biaxial | 165 | 2.6 | 148 | 2.8 |
| Ex. 26 | 21AF | Sequential Biaxial | 175 | 2.6 | 148 | 2.5 |
| Ex. 27 | 21AF | Sequential Biaxial | 165 | 3.0 | 145 | 2.2 |
| Ex. 28 | 21AF | Sequential Biaxial | 150 | 2.5 | 150 | 2.5 |
| Ex. 29 | 21AF | Uniaxial | 148 | 2.5 | — | — |
| Ex. 30 | 21AF | Simultaneous Biaxial | 155 | 2.5 | — | — |

Ex.: Example

INDUSTRIAL APPLICABILITY

The retardation film in accordance with the present invention is suitable as a retardation film in the liquid crystal display device.

The invention claimed is:

1. A retardation film composed primarily of an acrylic polymer, said film having an in-plane retardation of from 130 nm to 500 nm, inclusive, per 100 μm thickness at a wavelength of 589 nm, said film having a total light transmittance of not less than 85%, wherein the retardation film has a thickness of 20 μm to 200 um.

2. A retardation film composed primarily of an acrylic polymer, said film having a thickness-direction retardation in absolute value of from 70 nm to 400 nm, inclusive, per 100 μm thickness at a wavelength of 589 nm, said film having a total light transmittance of not less than 85%, wherein the retardation film has a thickness of 20 μm to 200 um.

3. The retardation film according to claim 1, wherein said film is obtained by uniaxial stretching.

4. The retardation film according to claim 1, wherein said film is obtained by biaxial stretching.

5. The retardation film according to claim 1, wherein said film has a glass transition temperature of from 110° C. to 200° C., inclusive.

6. The retardation film according to claim 1, wherein the acrylic polymer has a lactone ring structure.

7. The retardation film according to claim 6, wherein the lactone ring structure has general formula (1):

[Chem. 1]

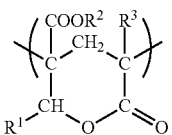

(1)

where each of $R^1$, $R^2$, and $R^3$ is independently either a hydrogen atom or an organic residue containing 1 to 20 carbons, and the organic residue may or may not contain an oxygen atom.

TABLE 8

| | Thickness (μm) | In-plane Retardation (nm) | Thickness-Direction Retardation (nm) | In-plane Retardation per 100 μm (nm) | Thickness-Direction Retardation per 100 μm (nm) | Total Light Transmittance (%) | Haze (%) | Tg (° C.) | Flexibility |
|---|---|---|---|---|---|---|---|---|---|
| Ex. 25 | 56 | 146 | 134 | 262 | 240 | 93 | 0.2 | 142 | Good |
| Ex. 26 | 48 | 147 | 127 | 305 | 265 | 93 | 0.4 | 142 | Good |
| Ex. 27 | 48 | 135 | 148 | 282 | 307 | 93 | 0.3 | 142 | Good |
| Ex. 28 | 64 | 91 | 130 | 142 | 203 | 93 | 0.2 | 142 | Good |
| Ex. 29 | 230 | 672 | 339 | 293 | 148 | 93 | 0.6 | 142 | Fair |
| Ex. 30 | 38 | 8 | 81 | 21 | 213 | 93 | 0.2 | 142 | Good |

Ex.: Example

8. The retardation film according to claim 1, wherein when folded 180° in a direction parallel to a slow axis in a film plane and in a direction perpendicular to the slow axis in the film plane with a folding radius of 1 mm in a 25° C., 65% RH atmosphere, said film allows no cracks to develop in either of the directions.

9. The retardation film according to claim 1, wherein said film contains 5 wt % to 50 wt %, inclusive, elastic organic fine particles.

10. The retardation film according to claim 1, wherein said film contains 0 wt % to less than 5 wt % elastic organic fine particles.

11. The retardation film according to claim 2, wherein said film is obtained by uniaxial stretching.

12. The retardation film according to claim 2, wherein said film is obtained by biaxial stretching.

13. The retardation film according to claim 2, wherein said film has a glass transition temperature of from 110° C. to 200° C., inclusive.

14. The retardation film according to claim 2, wherein the acrylic polymer has a lactone ring structure.

15. The retardation film according to claim 14, wherein the lactone ring structure has general formula (1):

[Chem. 1]

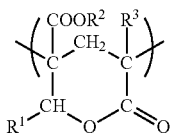
(1)

where each of $R^1$, $R^2$, and $R^3$ is independently either a hydrogen atom or an organic residue containing 1 to 20 carbons, and the organic residue may or may not contain an oxygen atom.

16. The retardation film according to claim 2, wherein when folded 180° in a direction parallel to a slow axis in a film plane and in a direction perpendicular to the slow axis in the film plane with a folding radius of 1 mm in a 25° C., 65% RH atmosphere, said film allows no cracks to develop in either of the directions.

17. The retardation film according to claim 2, wherein said film contains 5 wt % to 50 wt %, inclusive, elastic organic fine particles.

18. The retardation film according to claim 2, wherein said film contains 0 wt % to less than 5 wt % elastic organic fine particles.

19. The retardation film according to claim 1, wherein a molecular chain of the acrylic polymer has at least one ring structure selected from the group consisting of a structure produced by copolymerizing the acrylic polymer with an N-substituted maleimide, a lactone ring structure, a glutaric anhydride structure, and a glutarimide structure.

20. The retardation film according to claim 1, wherein the retardation film is obtained by melt extrusion.

21. The retardation film according to claim 2, wherein a molecular chain of the acrylic polymer has at least one ring structure selected from the group consisting of a structure produced by copolymerizing the acrylic polymer with an N-substituted maleimide, a lactone ring structure, a glutaric anhydride structure, and a glutarimide structure.

22. The retardation film according to claim 2, wherein the retardation film is obtained by melt extrusion.

* * * * *